US008095993B2

(12) United States Patent
Shu et al.

(10) Patent No.: US 8,095,993 B2
(45) Date of Patent: Jan. 10, 2012

(54) CRYPTOGRAPHIC ARCHITECTURE WITH INSTRUCTION MASKING AND OTHER TECHNIQUES FOR THWARTING DIFFERENTIAL POWER ANALYSIS

(75) Inventors: David B. Shu, West Hills, CA (US); Lap-Wai Chow, South Pasadena, CA (US); William Clark, Jr., Chiang Mai (TH)

(73) Assignee: HRL Laboratories, LLC, Malibu, CA (US)

( * ) Notice: Subject to any disclaimer, the term of this patent is extended or adjusted under 35 U.S.C. 154(b) by 688 days.

(21) Appl. No.: 11/628,920

(22) PCT Filed: Jun. 7, 2005

(86) PCT No.: PCT/US2005/020093
§ 371 (c)(1),
(2), (4) Date: Mar. 1, 2007

(87) PCT Pub. No.: WO2005/124506
PCT Pub. Date: Dec. 29, 2005

(65) Prior Publication Data
US 2007/0180541 A1 Aug. 2, 2007

Related U.S. Application Data

(63) Continuation-in-part of application No. 10/864,569, filed on Jun. 8, 2004, and a continuation-in-part of application No. 10/864,556, filed on Jun. 8, 2004, and a continuation-in-part of application No. 10/864,568, filed on Jun. 8, 2004, now Pat. No. 7,949,883.

(51) Int. Cl.
*G06F 11/00* (2006.01)
(52) U.S. Cl. ............ 726/34; 726/26; 713/189; 713/193; 713/194; 380/28; 380/29
(58) Field of Classification Search ...................... 726/34
See application file for complete search history.

(56) References Cited

U.S. PATENT DOCUMENTS

| 4,978,955 A | 12/1990 | Howell ...................... 341/109 |
| 5,560,000 A * | 9/1996 | Vogley ....................... 713/501 |
| 5,866,933 A | 2/1999 | Baukus et al. ............... 257/368 |

(Continued)

FOREIGN PATENT DOCUMENTS

DE 199 36 939 A1 4/2000

(Continued)

OTHER PUBLICATIONS

Hollmann, H.D.L., et al., "Protection of Software Algorithms Excuted on Secure Modules", *Future Generation Computer Systems*, Elsevier Science Publishers, Amsterdam, NL, vol. 13, No. 1, pp. 55-63 (Jul. 1997).

(Continued)

*Primary Examiner* — Kambiz Zand
*Assistant Examiner* — Yonas Bayou
(74) *Attorney, Agent, or Firm* — Ladas & Parry

(57) ABSTRACT

An apparatus and method for preventing information leakage attacks that utilize timeline alignment. The apparatus and method inserts a random number of instructions into an encryption algorithm such that the leaked information can not be aligned in time to allow an attacker to break the encryption.

10 Claims, 13 Drawing Sheets

U.S. PATENT DOCUMENTS

| | | | | |
|---|---|---|---|---|
| 5,944,833 | A | 8/1999 | Ugon | 713/400 |
| 6,060,908 | A | 5/2000 | Heyne et al. | 326/93 |
| 6,076,161 | A | 6/2000 | Ho | 713/2 |
| 6,208,135 | B1 * | 3/2001 | Shattil | 324/225 |
| 6,294,816 | B1 | 9/2001 | Baukus et al. | 257/368 |
| 6,295,606 | B1 * | 9/2001 | Messerges et al. | 713/189 |
| 6,298,135 | B1 * | 10/2001 | Messerges et al. | 380/1 |
| 6,298,153 | B1 | 10/2001 | Oishi | 382/186 |
| 6,299,069 | B1 | 10/2001 | Shona | 235/492 |
| 6,317,820 | B1 * | 11/2001 | Shiell et al. | 712/32 |
| 6,408,075 | B1 * | 6/2002 | Ohki et al. | 380/28 |
| 6,613,661 | B1 | 9/2003 | Baukus et al. | 438/598 |
| 6,715,010 | B2 | 3/2004 | Kumata | 710/71 |
| 6,839,847 | B1 | 1/2005 | Ohki et al. | 713/194 |
| 7,127,620 | B2 * | 10/2006 | Boeckeler | 713/194 |
| 2001/0025344 | A1 | 9/2001 | Teglia | 713/200 |
| 2002/0131596 | A1 * | 9/2002 | Boeckeler | 380/252 |
| 2002/0169968 | A1 | 11/2002 | Gammel et al. | |
| 2003/0005321 | A1 | 1/2003 | Fujioka | 713/193 |
| 2003/0044003 | A1 | 3/2003 | Chari et al. | 380/28 |
| 2003/0093684 | A1 * | 5/2003 | Kaiserswerth et al. | 713/193 |
| 2003/0110390 | A1 * | 6/2003 | May | 713/194 |
| 2003/0118190 | A1 * | 6/2003 | Sedlak et al. | 380/277 |
| 2004/0039928 | A1 | 2/2004 | Elbe et al. | 713/189 |
| 2004/0088488 | A1 * | 5/2004 | Ober et al. | 711/125 |
| 2005/0169462 | A1 | 8/2005 | Jung et al. | 380/28 |
| 2005/0193045 | A1 * | 9/2005 | Yamamoto et al. | 708/250 |
| 2005/0232430 | A1 | 10/2005 | Gebotys | 380/286 |
| 2005/0271202 | A1 | 12/2005 | Shu et al. | 380/29 |
| 2005/0273630 | A1 * | 12/2005 | Shu et al. | 713/189 |
| 2005/0273631 | A1 | 12/2005 | Shu et al. | 713/190 |
| 2006/0282678 | A1 * | 12/2006 | Ali et al. | 713/185 |

FOREIGN PATENT DOCUMENTS

| | | |
|---|---|---|
| DE | 19845073 | 4/2000 |
| EP | 1 006 492 A | 6/2000 |
| EP | 1006492 A1 | 6/2000 |
| EP | 1 098 469 | 5/2001 |
| EP | 11191149 (A) | 4/2011 |
| FR | 2 862 150 A | 11/2002 |
| JP | 11-191149 | 7/1999 |
| WO | 2001/90854 | 11/2001 |
| WO | 2004/053662 A | 6/2004 |

OTHER PUBLICATIONS

International Search Report of PCT/US2005/020093.

Aigner, M., et al., "Power Analysis Tutorial," *Institute for Applied Information Processing and Communication*, University of Technology, Graz, Austria, pp. 1-15.

"American National Standard Data Encryption Algorithm," *American National Standards Institute, Inc.*, ANSI x3, 92/1981, pp. 9-16 (1981).

Kocher, P., et al., "Differential Power Analysis," *Cryptography Research of San Francisco*, California, pp. 1-10, (1998).

Kocher, P., et al., "Introduction to Differential Power and Related Attacks," *Cryptography Research Inc.*, Internert: <http://www.cryptography.com/resources/whitepapers/DPA-technical.html> pp. 1-5 (1998).

Messerges, T.S., "Investigations of Power Analysis Attacks on Smartcards," *Proceedings o USENIX Workshop on Smartcard Technology*, pp. 151-161 (May 1999).

* cited by examiner

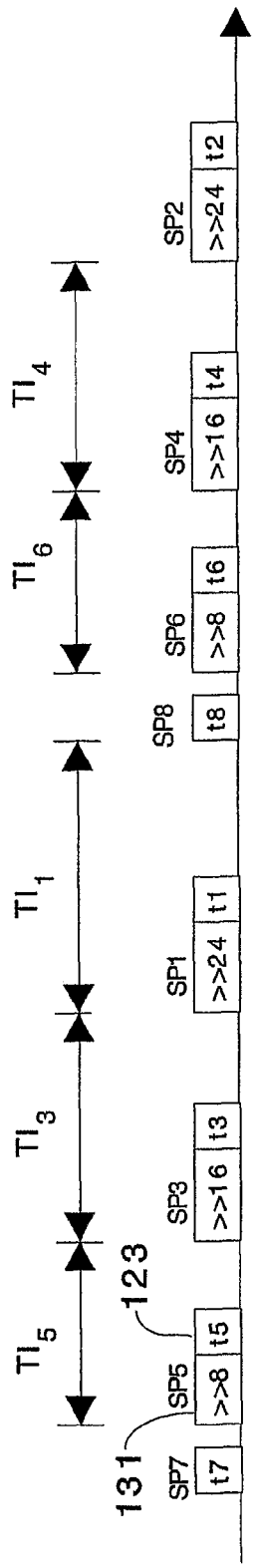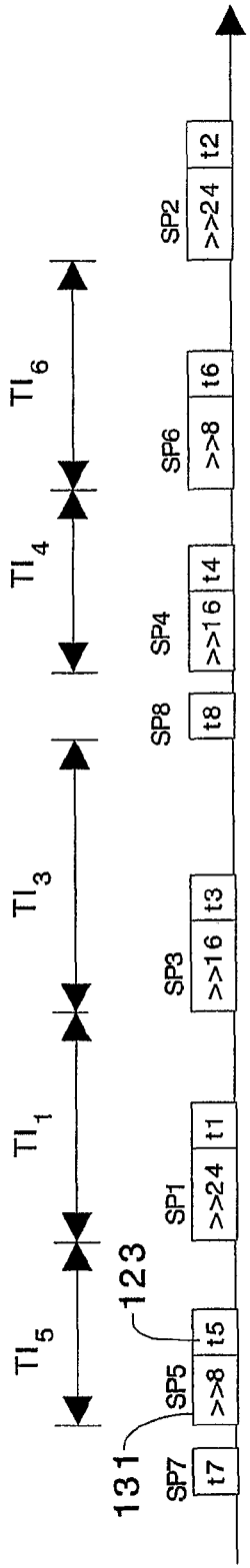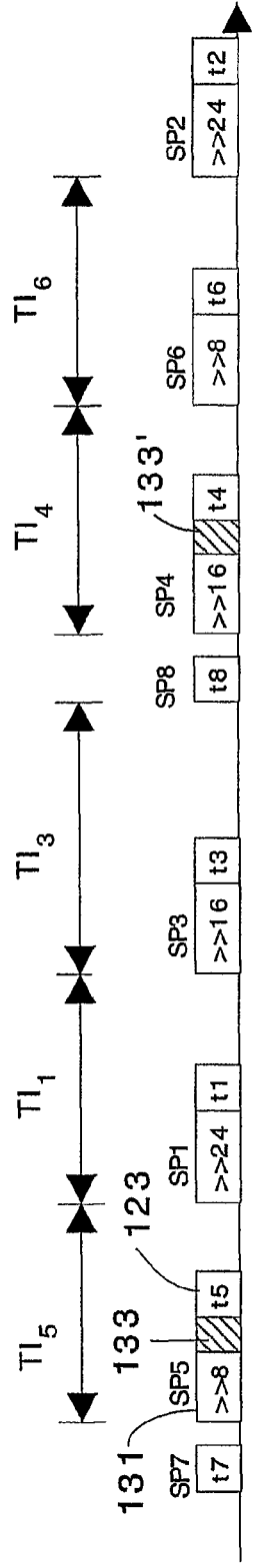

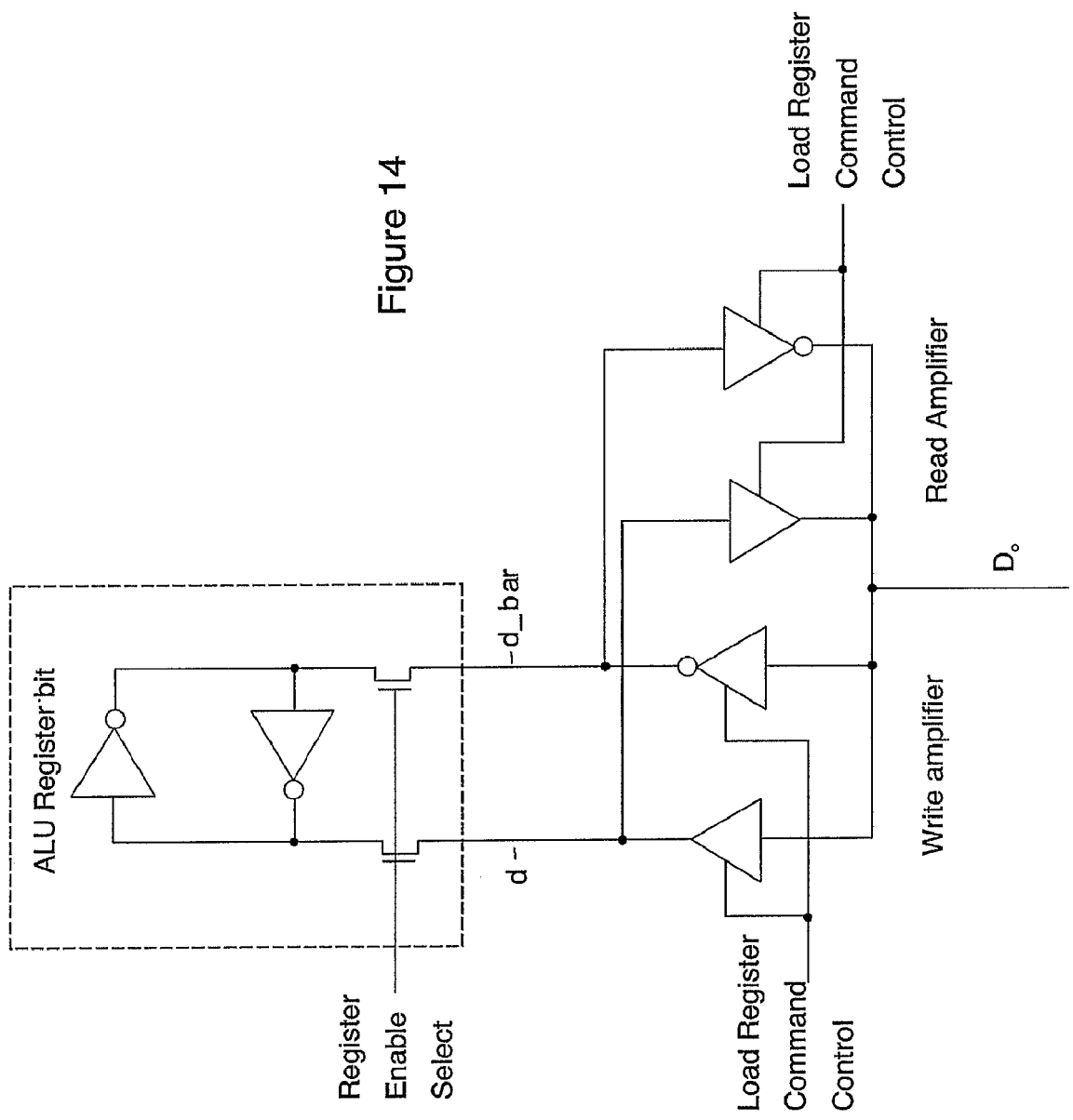

CRYPTOGRAPHIC ARCHITECTURE WITH INSTRUCTION MASKING AND OTHER TECHNIQUES FOR THWARTING DIFFERENTIAL POWER ANALYSIS

CROSS REFERENCE TO RELATED APPLICATIONS

This application is a continuation-in-part of U.S. patent application Ser. Nos. 10/864,569; 10/864,556 and 10/864,568 now U.S. Pat. No. 7,949,883 all filed on Jun. 8, 2004 and respectively entitled "Cryptographic Architecture with Random Instruction Masking to Thwart Differential Power Analysis", "Cryptographic Bus Architecture for the Prevention of Differential Power Analysis" and "Cryptographic CPU Architecture with Random Instruction Masking to Thwart Differential Power Analysis." The disclosure of each of these related applications is hereby incorporated by reference.

BACKGROUND OF THE INVENTION

1. Field of the Invention

The present invention relates to the security of cryptographic methods and the cryptographic architecture of a processor used in microelectronic assemblies, such as Smart Cards and the like, in order to prevent security breaches of the same when a Differential Power Analysis (DPA) attack is utilized.

2. Description of Related Art

Cryptographic techniques are well-known in the art. Indeed, they date from at least the time of Caesar when the need to keep certain information secret from prying eyes became important enough for people to find ways to disguise the information by means of codes and ciphers.

Today, cryptographic techniques are in a wide array of applications, both governmental and private. One application of cryptographic techniques is to protect information stored in a Smart Card and/or to protect the capabilities of the Smart Card from unauthorized use or modifications. Cryptographic devices, such as Smart Cards, use secret keys to process input information and/or to produce output information. It has been assumed that the information stored in a cryptographic device, such as a Smart Card, is relatively safe from attack provided that an especially strong cryptographic technique is utilized.

Modern cryptography utilizes transposition and substitution of digital data. Messages to be encrypted, known as plaintext, are transformed by a function that is parameterized by a key. The output of the encryption process, known as the ciphertext, is then transmitted. The received ciphertext is then decrypted, using a key, back into plaintext.

One example where modern cryptography is used is in pay-TV conditional-access systems such as pay channels for cable and satellite television. Smart cards and/or security processors (containing secret keys) are used to decrypt the television signals. Attackers buy a cable or satellite receiver and then attack the smart card or security processor inside in order to determine the secret keys. The cipher text is the information sent from the cable or satellite provider, and the plaintext is the decrypted television signal sent to the television. Thus, it is generally assumed that the input and output information, i.e. the plaintext and ciphertext, is available to attackers, and information about the secret keys is unavailable. FIG. 1 depicts a cryptographic system. An attacker may attack the smart card or security processor by looking for information related to the secret keys that may be leaked via EM radiation, power consumption, timing etc. The leaked information, commonly referred to as side channel information, can then be used by attackers in order to determine the secret key used. One common technique for determining a secret key from leaked or side channel information is known as Differential Power Analysis (DPA). Unfortunately, there is no way to guarantee that power consumption, EM radiation, etc. will not leak certain cryptographic process information being performed by a device and thus obtain information about the secret keys. Therefore, defensive techniques are needed that produce leaked information that is unusable by hackers using correlation techniques such as DPA.

The following background discussion is provided in order to supply a context for one application of the presently disclosed technology, which involves a well-known cipher, the data encryption standard (DES), for which DPA analysis is commonly used to break. One skilled in the art will appreciate that this discussion is for illustration purposes only, and that the present invention may be utilized to protect secret keys of a number of data encryption formats from a number of hacking techniques in which side channel information is used in order to determine the secret keys.

The well-known DES cipher utilizes a number, typically 16, of substitution box (S-Box) functions. The S-Box functions are non-linear and can be implemented by using table lookups, Boolean logic or appropriately programmed computers.

It has been discovered within the past several years that DPA can be utilized by attackers to determine the secret keys used in cryptographic devices employing DES such as Smart Cards, where in particular the digital encryption standard (DES) is used. See, for example, *Differential Power Analysis* published by Paul Coker, et al., Cryptographic Research of San Francisco, Calif. A tutorial on DPA is also provided in the article, *Power Analysis Tutorial*, published by Manfred Aigner, et al., of the Institute for Applied Information Processing and Communication, University of Technology, Graz, Austria. As described in these references, in order to utilize the DPA technique, the attacker monitors the power consumption of the cryptographic device. The fluctuations in the power used by the device reflect the operations going on within the device and that, in turn, can be used to glean information about the secret keys stored within the device.

It is emphasized, however, that side channel information other than power consumption information may be studied by DPA to extract encryption keys. Some examples are electromagnetic (EM) radiation and faulty outputs. Unfortunately, there is no way to guarantee that power consumption, EM radiation, and the like, will not leak certain information, and it is believed that it is impractical to expect cryptographic devices, such as Smart Cards, to be completely leak-free in terms of information being able to be discerned by their power consumption, EM radiation or the like. However, defensive techniques can be used that make whatever information is leaked uncorrelatable, even if sophisticated statistical approaches are used, for example, in the DPA process. As such the present invention is concerned with a solution to the problem of making power consumption information uncorrelatable to the secret keys stored within a cryptographic device, such as a Smart Card.

In the prior art, certain decorrelation techniques do exist. See, for example, U.S. Pat. Nos. 6,295,606 and 6,298,153 to Messerges, at al., and published European Patent Application Number 1,098,469 of Boeckeler.

The decorrelation techniques discussed in published European Patent Application Number 1,098,469 by Gregor Boeckeler, superimpose a random current profile based on a secondary clock CLK2, inserted upon the existing profile of a CPU which is based on a master clock CLK1. Each clock is randomly adjusted in a range between 3-7 MHz. Due to two clocks differing from one another with respect to their center frequencies, the combined current profile is randomized which makes a DPA attacker's job more difficult.

Thomas Messerges, in U.S. Pat. No. 6,208,135, uses a randomized starting point in the set of target bits. Mr. Messerges processes the corresponding target bits in a different order, thus it becomes difficult for a DPA attacker to group related target bits from all the plaintexts of interest in order to perform statistical analyses associated with given target bit positions. However, not only does this approach not conceal the information leaked by a data bus; it also cannot prevent a malicious attacker from using this information to reorder the target bit into the correct bit position.

Mr. Messerges also developed another technique, as discussed in U.S. Pat. No. 6,295,606, that uses a random mask to keep the message and key hidden both while they are stored in memory, and during processing by the cryptographic algorithm itself However, since the mask is randomly changed, new S-boxes must be updated accordingly, and this takes time. The disadvantage is that this kind of masking operation slows down the DES algorithm by a factor of three to five. In addition, this kind of masking operation cannot prevent an attacker from gathering a 48-bit partial key from Round Sixteen when the results must be eventually unmasked to provide the correct output of the cipher. Thus Messerges' approach becomes vulnerable to DPA after unmasking. With 48 bits now known at Round Sixteen, the remaining six key bits to make 56 can then be exhaustively searched by an attacker. The present approach is computationally faster, and it also can prevent an attacker from gathering the partial key from Round Sixteen of the DES algorithm.

These prior art approaches have certain limitations and therefore need improvement. This invention proposes a unique Random Instruction Mask (RIM) as a countermeasure to the DPA process, effectively making power consumption un-correlatable to cipher bit values. The present invention has the following advantages over the techniques of Messerges, Boeckler and others:

(1) More Efficient Calculations: The techniques taught by Messerges et al. slow down the DES algorithm by 300 to 500% due to the regular update of the S-boxes. In the present invention, the DES algorithm will be slowed down by approximately 15%.
(2) More Robust: Even in the presence of leaked information for multiple address locations.
(3) Better Protection: 48-bits of a key can be completely concealed in the last DES round, (in DES the output is unmasked at the end of the algorithm thereby exposing the key, which is not solved by the prior art), and
(4) Low Power Consumption: There is an increase in power consumption by less than 1% compared to Boeckeler's random current profiling, which increases power consumption to about 200% during cryptographic operations.

Before discussing the details of the preferred embodiments disclosed herein, additional details related to the DES algorithm and DPA attacks will be provided. If the reader is new to this area, further information may be found in the following articles: P. Kocher, J. Jaffe, and B. Jun, "Introduction to Differential Power Analysis and Related Attacks," 1998; Thomas S. Messergers; Ezzy A. Dabbish, and Robert H. Sloan, "Investigations of Power Analysis Attacks on Smartcards", in *Proceedings of USENIX Workshop on Smartcard Technology*, Chicago, Ill., May 1999, pp. 151-161; and Manfred Aigner and Elisabeth Oswald, "Power Analysis Tutorial" Institute for Applied Information Processing and Communication University of Technology Graz, Austria. The following discussion is offered to provide a context for a detailed explanation of the presently disclosed technology.

The DES algorithm is an example of an iterative-block cipher. DES is described in detail in ANSI X.392, "American National Standard for Data Encryption Algorithm (DEA)," American Standards institute, 1981, which is incorporated by reference herein. The DES cipher is well known and utilizes a number, typically sixteen, of substitution-permutation box (SP-Box) functions instituted in program sequences called rounds. The SP box functions are non-linear and are conventionally implemented using lookup tables or Boolean logic gates or appropriately programmed computers. In each of the sixteen rounds, the DES encryption algorithm performs eight SP box operations, in turn, by accessing sequentially each lookup table (or by using equivalent logic gates). The eight SP boxes each take, as input, a scrambled 6-bit key, (here, scrambled means that the key has been XOR-ed and shifted) and produce a 4-bit output target to be accessed by the CPU for OR-ing operations. Each such 6-bit scrambled key is an SP box's entry address. Table 1 shows the C-language representation of SP boxes 1 and 2 in a 32-bit implementation of DES. DES can run with 16, 32, and 64 bits but we have chosen the 32-bit representation as a nominal example. From Table 1 note that each SP lookup contains 64 elements. Each element in a nominal DES implementation is 32-bits and embeds a given 4-bit output target. This embedding will now be described in greater detail.

The data bus is typically 32-bits wide, this 4-bit output target is distributed somewhere within a 32-bit word according to the permutation rules (one per SP box) as implied in Table 1, where the data is presented in a hexadecimal format. That is, each SP lookup table will have a different embedding position for a given 4-bit output target. For example, lookup table SP1, shown in Table 1, embeds a 4-bit output target at bit positions 24, 16, 10 and 2 in a 32-bit word. Lookup table SP2 embeds a 4-bit output target at bit positions 20, 5, 31 and 15, where bit 20 is the most significant bit (MSB) and bit 15 is the least significant bit (LSB) for a given 4-bit output. As a further illustration, the first four entries of lookup table SP1, i.e., SP1 [0:3]={0x01010400L, 0x00000000L, 0x00010000L, 0x01010404L} have 4-bit output target values of 14, 0, 4, 15. Specifically, SP1[0]={0x01010400L} is embedded with a 4-bit output target value of 14 (i.e, 1110). For example, for SP1[0] the 32 bit binary word is 0000 0001 0000 0001 0000 0100 0000 0000. The right most digit is the LSB while the left most digit is the MSB for a given 32-bit binary word. To derive the 4-bit output target, the values of the bits at 24, 16, 10, and 2 are used. For example, for SP1 [0] the 4-bit output target is 1110. This is determined by looking for the MSB value of the 4-bit output target at position 24, the next bit is at position 16, the third bit is at position 10, and finally the LSB of 0 is at position 2 of the 32 bit binary word SP1[0]. The bit positions, 24, 16, 10 and 0 are underlined in the binary representation given above. The fourth entry SP1[3]= {0x01010404L}, (which differs from the 1110 of SP1[0] only at the LSB), has a 4-bit output target value of 15 (i.e., 1111).

On the other hand, the lookup table SP2 illustrates different embedding bit position scheme as shown in the first four entries of lookup table SP2, i.e., SP2[0:3]={0x80108020L, 0x80008000L, 0x00080000L, 0x00108020L.} Only the contents at bit positions 20, 5, 31 and 15 are changed to reflect the values of 15, 3, 1, 13 for the corresponding 4-bit blocks. In particular, the first entry of lookup table SP2, SP2[0]= {0x80108020L] has a 4-bit output target value of 15 (i.e., 1111) because bit 20, 5, 31 and 15 all have a value of 1. The fourth entry SP2[3]={0x001080201}, (which differs with 1111 of SP2[0] only at the 2nd LSB), has a 4-bit target value of 13 (i.e., 1101).

Having established the relationship between the 4-bit output target and its corresponding SP box's entry, next the calculation of a given SP box's entry address is discussed. In general, a DES algorithm uses shifting instructions running in the CPU to calculate a box's entry address. Both the number of shifting instructions used in a specific SP box's entry address calculation and the time interval between each consecutive access of an SP box will be well known to anyone who is familiar with the DES algorithm. In view of this fact, DPA attacks are focused on aligning the power traces of each 4-bit output target of an SP box by referencing the preceding shifting instruction signature unique to that box. As shown in Table 2, under conventional operation, the accessing of each SP box is preceded by a different amount of shifts: >>8, >>16 or >>24 ('>>' stands for a right shift in the C computer language and thus '>>n' stands for a right shift of n bits). One skilled in the art will recognize that the routine in Table 2 is written in the C computer language. FIG. 2a shows a corresponding time line with normal accessing order for eight SP boxes [SP1 . . . SP8]. Since each shift instruction normally shifts one bit at a time, >>8 normally implies eight right bit shift instructions, >>16 normally implies sixteen right bit shift instructions, and so forth. The shift for SP5 are identified by numeral 131.

In order to align the power traces, a DPA attacker looks for patterns in the power trace. To determine a SP address calculation for SP box 5 (SP5), the DPA attacker looks for a pattern indicating eight shifts as seen in Table 2. In addition, the DPA attacker would know that the time from the beginning of the eight shifts (see numeral 131) to the beginning of a next set of shifts is equal to a time $TI_5$ as shown in FIG. 2a. Thus, the DPA attacker, when finding this pattern in a power trace, would know that the SP address calculation for SP5 has been found (at numeral 123). In addition, the attacker would also know that the information in the power trace for the time slot following the end of the eight shifts would contain the corresponding 4-bit output target information. This information allows for the alignment of the power traces for statistical averaging which provides information regarding the 6-bit key. One skilled in the art will appreciate that power traces are noisy, thus finding instruction signatures and other patterns may not guarantee the success of a DPA attack. However, the instruction signatures and other patterns are available in the prior art for an attacker to use. By destroying these instruction signatures and time patterns, the success of a DPA attack is even more unlikely.

FIG. 2b shows the time line with randomized accessing order for the eight SP boxes. As an illustration in FIG. 2b, the processing order of SP1 and SP3 has been swapped, and similarly for the SP4 and SP6. In this case, it is obvious that a DPA attacker will have to identify these shifting instruction signatures in order to align power traces by re-shuffling the SP box accessing order. After alignment for a given SP box, statistical averaging and other analysis of these power traces can be performed. Thus, the DPA attacker can ultimately align the power traces to determine the 6-bit key.

SUMMARY OF THE DISCLOSED TECHNOLOGY

In one embodiment, the present invention provides a method of inhibiting a successful DPA of a cryptographic device comprising: randomly varying an amount of time required to determine at least one lookup table address; and randomly varying an amount of time occurring between one access of at least one lookup table and a subsequent access of another lookup table.

In another embodiment, the present invention provides a cryptographic architecture comprising: a processor; a memory module containing an encryption algorithm coupled to said processor, a control flag register coupled to said processor for controlling the state operation of the processor, and a random number generator coupled to said control flag register, wherein said processor sets said control flag register and said random number generator resets said control flag register.

In yet another embodiment, the present invention provides a system for thwarting DPA, said system comprising: means for running an encryption algorithm and means for inserting a random number of pseudo instructions into said encryption algorithm.

In still another embodiment, the present invention provides a system for decorrelating side channel information, said system comprising: means for running a Data Encryption Standard (DES) algorithm, said DES algorithm comprising a plurality of substitution/permutation box entry address evaluations and means for inserting a random number of shifting instructions run in each of said plurality of substitution/permutation box entry address evaluations.

In yet another embodiment, the present invention provides a method of altering a power trace of a cryptographic architecture comprising the steps of: running an encryption algorithm; setting a control flag; and performing a random number of instructions when said control flag is set.

In still yet another embodiment the present invention provides a method of inhibiting a successful differential power analysis of a cryptographic device comprising randomly increasing an amount of time required to determine at least one lookup table address; and randomly increasing an amount of time occurring between one access of at least one lookup table and a subsequent access of another lookup table.

In still yet another another embodiment, the present invention provides a cryptographic architecture comprising: a processor; a memory module containing an encryption algorithm coupled to said processor; a control flag register coupled to said processor for controlling the state operation of the processor, and a random number generator coupled to said control flag register, wherein said processor sets said control flag register and said random number generator resets said control flag register.

In yet another embodiment, the present invention provides a system for thwarting differential power analysis, said system comprising: means for running an encryption algorithm and means for inserting a random number of pseudo instructions into said encryption algorithm.

In still yet another embodiment, the present invention provides a system for de-correlating side channel information, said system comprising: means for running a Data Encryption Standard (DES) algorithm, said DES algorithm comprising a plurality of substitution/permutation box entry address evaluations and means for inserting a random number of shifting instructions run in each of said plurality of substitution/permutation box entry address evaluations.

In yet another embodiment, the present invention provides a method of altering a power trace of a cryptographic architecture comprising the steps of: running an encryption algorithm; setting a control flag; and performing a random number of instructions when said control flag is set.

In yet another embodiment, the present invention provides a cryptographic CPU architecture comprising: an ALU; a control flag; a plurality of registers for normally receiving output of the ALU in response to an arithmetic instruction; and an additional register for receiving output of the ALU, in lieu of one of the plurality of registers, in response to an arithmetic instruction when the control flag is set.

In yet another embodiment, the present invention provides a method of concealing data processing occurring in a CPU from power analysis during the execution of a program, the method comprising: (i) at a point during the execution of the program, inserting a random number of program counter cycles instruction fetch cycles; (ii) while the random number of instruction fetch cycles are occurring, fetching instructions from memory, executing those instructions in program sequence, but inhibiting updating of normal memory locations based on the execution of those instructions; and (iii) at the conclusion of said random number of instructions, then recommencing normal program execution by refetching the same instructions which were initially fetched while the random number of instruction fetch cycles were occurring, but when the instructions are refetched, updating memory locations in a normal manner for the CPU.

In still yet another embodiment, the present invention provides a method of concealing data processing occurring in a CPU from power analysis during the execution of a program, the method comprising: (i) at a point during the execution of the program, inserting a random number of program counter cycles instruction fetch cycles; and (ii) while the random number of instruction fetch cycles are occurring, mimicking power consumption associated with (a) fetching instructions from memory, (b) executing those instructions in program sequence, and (c) writing results to memory registers.

In still another embodiment, the present invention provides a data processor comprising: an arithmetic logic unit; a control flag register, a plurality of registers for normally receiving output of the arithmetic logic unit in response to an arithmetic instruction and in response to a first state of said control flag register; and a dummy register for receiving output of the arithmetic logic unit, in lieu of one of the plurality of registers, in response to an instruction and in response to a second state of said control flag register.

In another embodiment, the present invention provides a cryptographic bus architecture comprising: a random number generator having a plurality of random number outputs at which a multi-bit random number is output; a plurality of bi-directional bus drivers, each bi-directional bus driver having at least one input for receiving at least one of said random number outputs; and a bus coupling at least one of said plurality of bi-directional bus drivers to at least another of said bi-directional bus drivers; wherein bi-directional bus drivers that are coupled to a common line of said bus are controlled by a common selected one of said random number outputs.

In another embodiment, the present invention provides a method of preventing a breach of security comprising the steps of sending encrypted bits over a bus; and randomly toggling the polarity of said encrypted bits on said bus.

In another embodiment, the present invention provides a method for protecting secret keys comprising: providing a plurality of bi-directional bus drivers; coupling a line of a data bus between at least a first bi-directional bus driver of said plurality of bi-directional bus drivers and a second bi-directional bus driver of said plurality of bi-directional bus drivers; signaling said first bi-directional bus driver to provide a first set of bits to said bus, said bits having a first polarity; signaling said second bi-directional bus driver to receive said first set of bits having said first polarity; randomly signaling said first bi-directional bus driver to provide a second set of bits to said bus, said second set of bits having an opposite polarity than said first set of bits; and signaling said second bi-directional bus driver to receive said second set of bits having said opposite polarity.

BRIEF DESCRIPTION OF THE FIGURES

FIG. 2a is a prior art timeline corresponding to the normal accesses of eight SP lookup tables for a given round;

FIG. 2b is a prior art timeline corresponding to a randomized accessing order of the eight SP lookup tables for a given round;

FIG. 3 is a time line with both the time intervals and SP boxes accessing orders being randomized by Random Instruction Masking (RIM) in accordance with the present disclosure;

FIG. 14 depicts a block diagram of bit writing with dual rails in accordance with the cryptographic bus architecture embodiment.

BRIEF DESCRIPTION OF THE TABLES

Table 1 shows values, expressed in the C language, for SP-boxes 1 and 2 implemented as lookup tables of 64 elements.

Table 2 is a C language program that sequentially accesses DES's eight SP lookup tables for a given round.

Table 3 is an assembly language program to implement C program statement number 5 of Table 2.

Table 4 is an assembly language program to implement a portion of the DES encryption algorithm that performs eight S and P boxes' operations in turn by accessing sequentially each lookup table.

Figure 7:
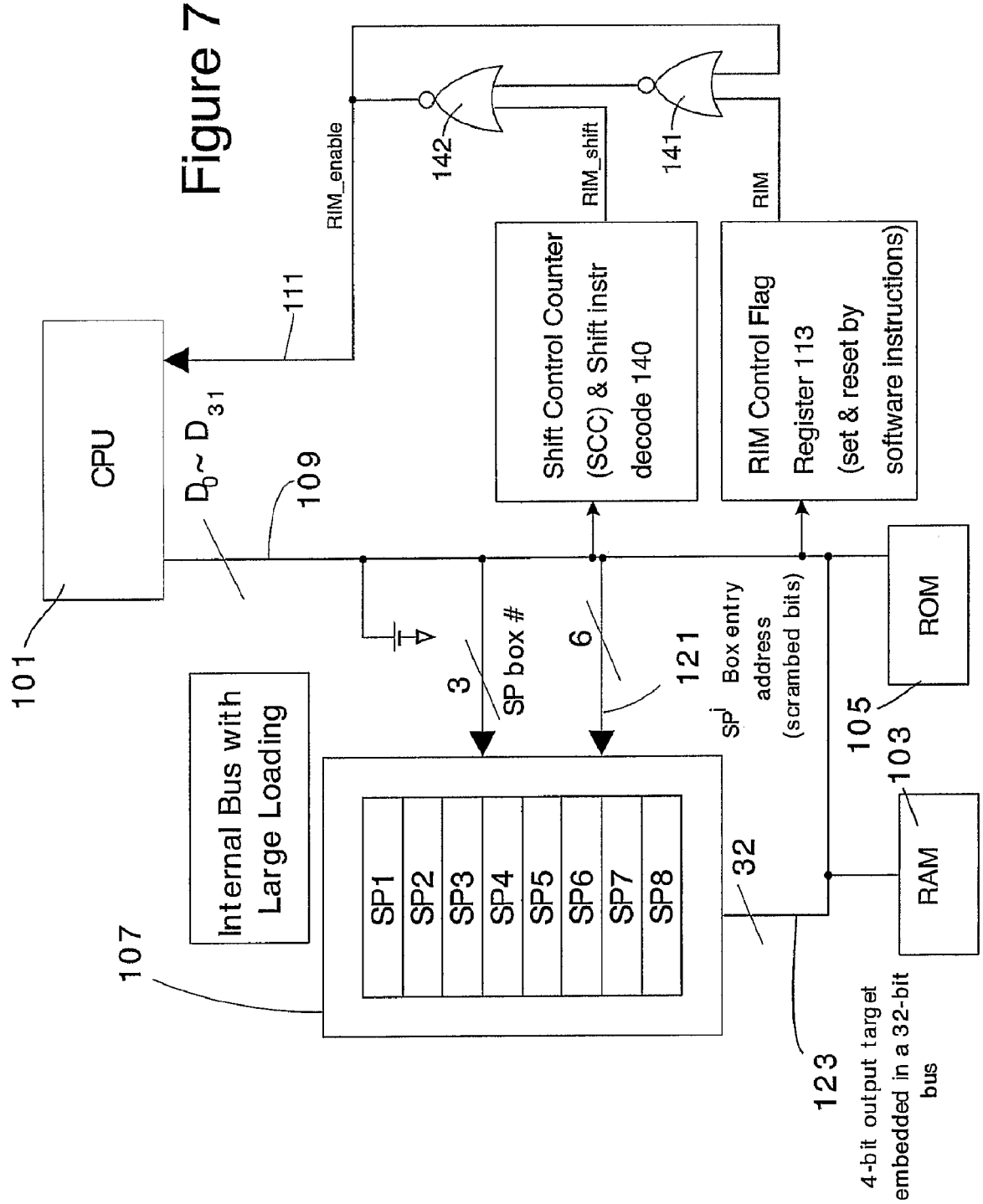
FIG. 7 is a block diagram of a third embodiment of a hardware architecture for implementing the DES algorithm in accordance with the present disclosure.

Table 5 is an assembly language program of to implement C program statement number 5 of Table 2 using the embodiment of FIG. 7.

INTRODUCTION

The presently disclosed technology now will be described more fully hereinafter with reference to the accompanying drawings, in which a preferred embodiments of the technology are described with reference to FIGS. 7 and 8. However, before discussing FIGS. 7 and 8, this detailed description leads the reader through FIGS. 3-6 which repeats the description of some of the material presented in the related applications noted above. These descriptions are useful in better understanding the improvements disclosed by FIGS. 7 and 8.

Figure 6:
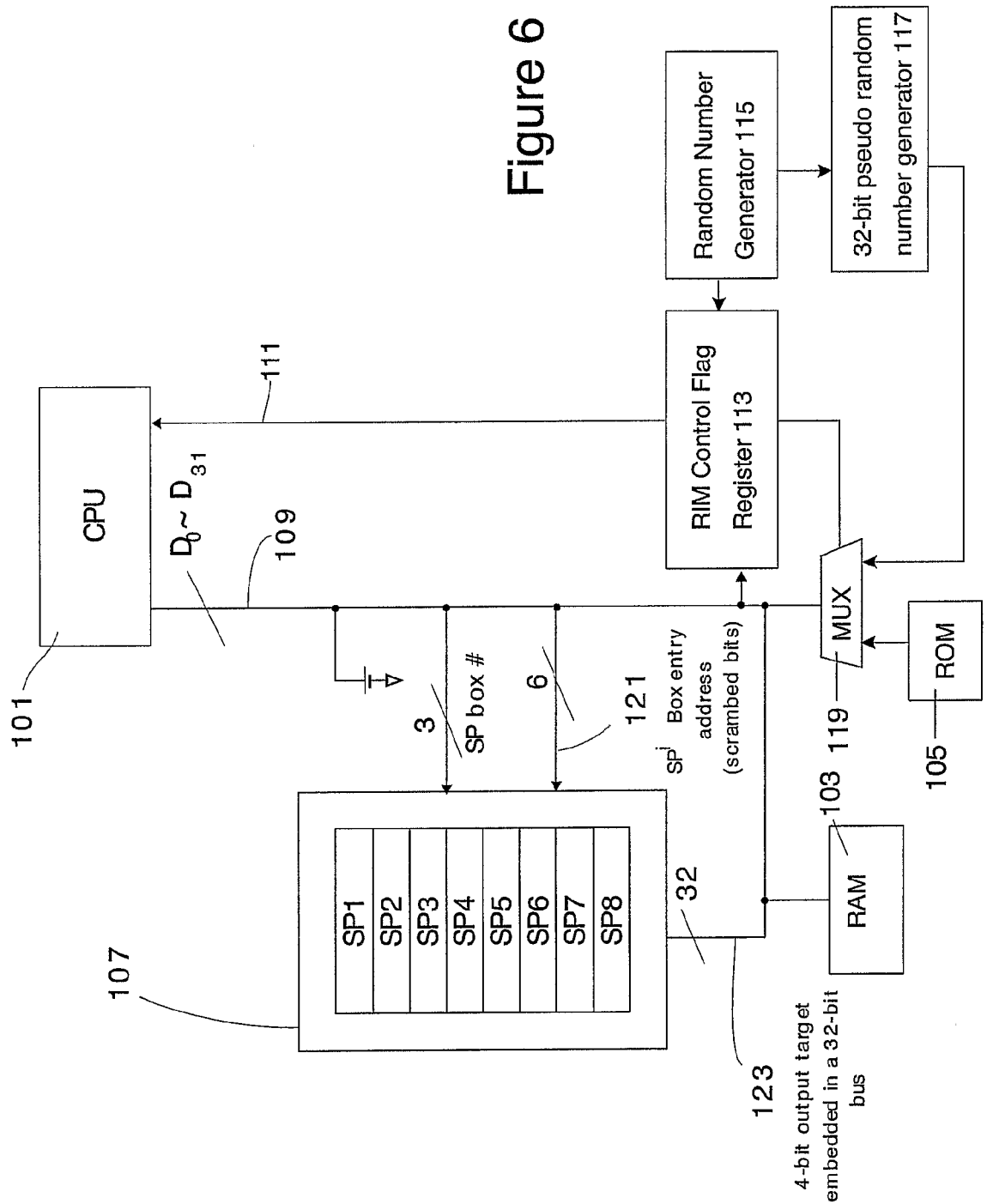
FIG. 6 is a block diagram of a second embodiment of a hardware architecture for implementing the DES algorithm in accordance with the present disclosure.
Figure 9:
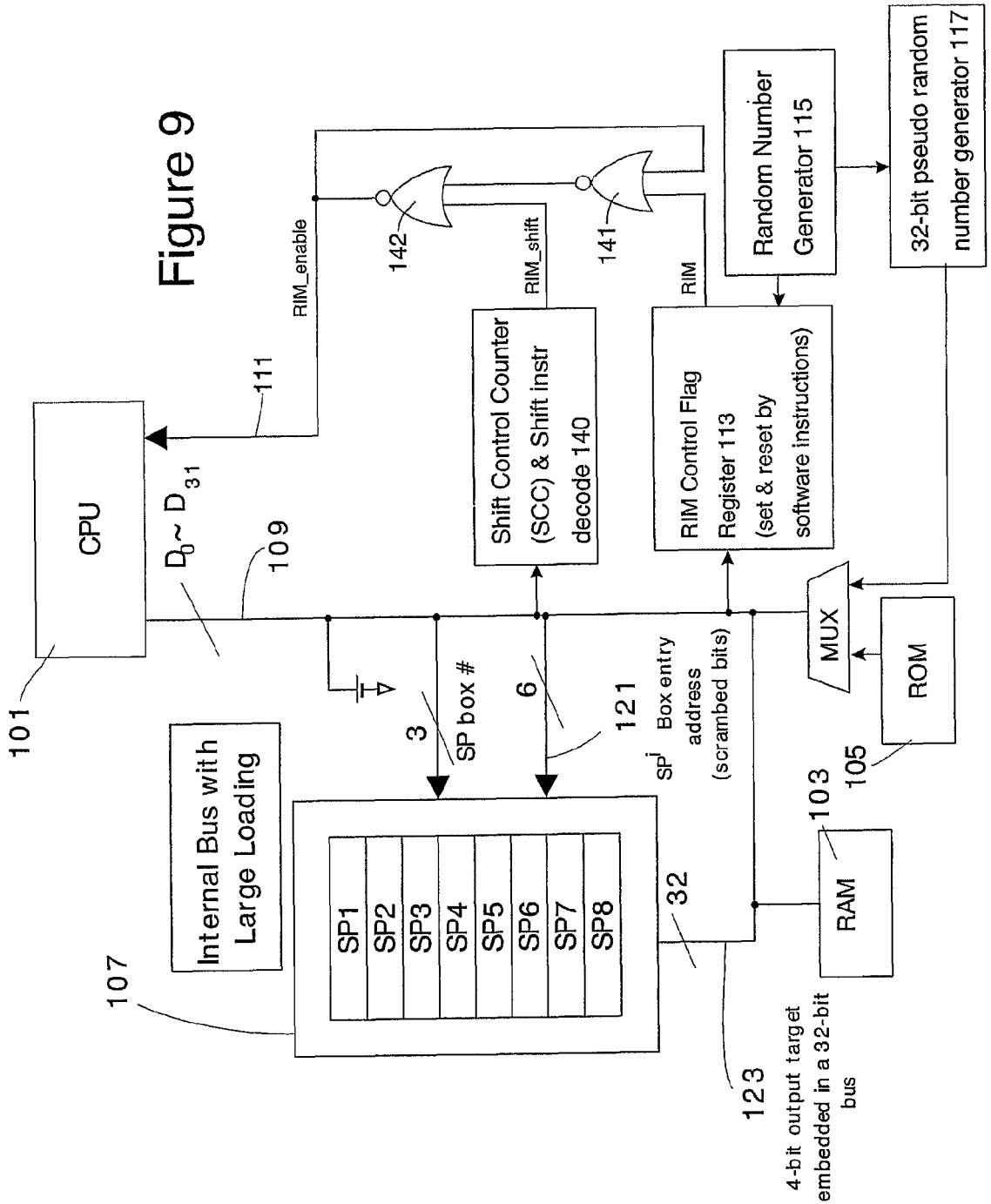
FIG. 9 is a block diagram of a fourth embodiment of a hardware architecture for implementing the DES algorithm in accordance with the present disclosure.

FIG. 9 depicts a fourth embodiment which is basically a combination of the embodiments of FIGS. 6 and 7.

Figure 11:
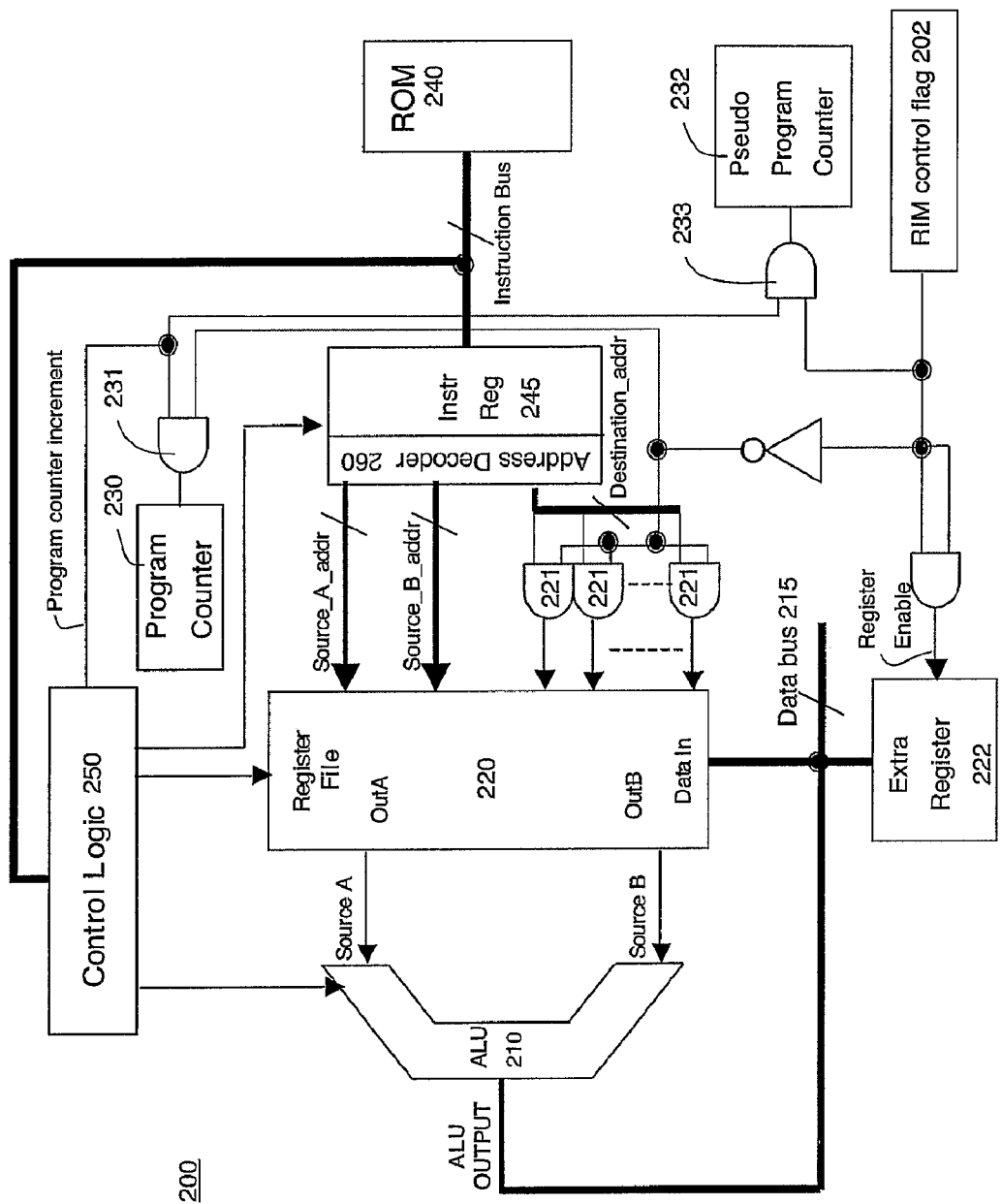
FIG. 11 is a block diagram a RISC CPU in accordance with a sixth embodiment of the present invention.

FIG. 11 depicts a fifth embodiment which is based on a modified RISC CPU design, but the modifications discussed may also be used with non-RISC CPUs if desired.

Figure 12:
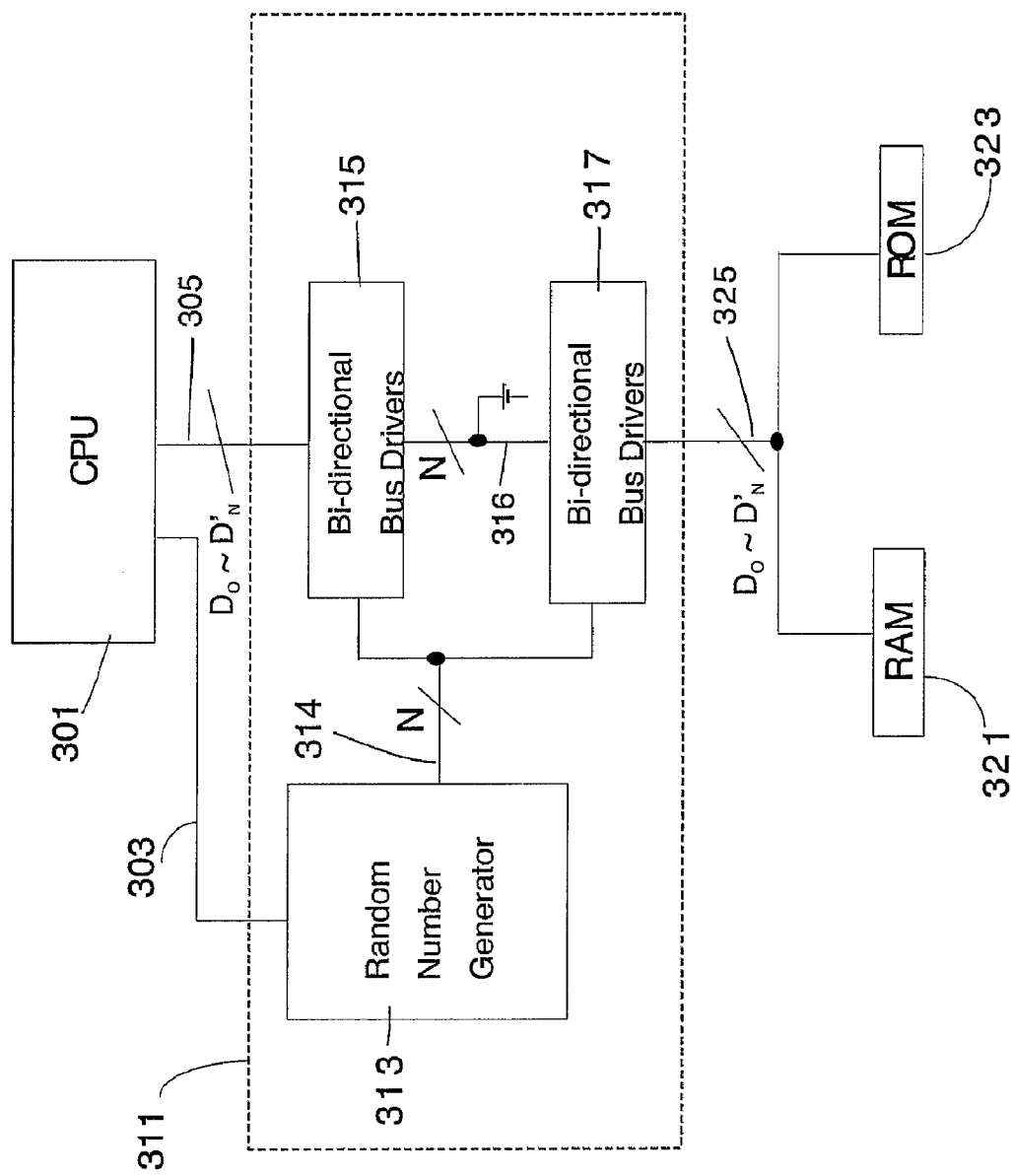
FIG. 12 is a block diagram of a system in accordance with a cryptographic bus architecture embodiment.
Figure 13:
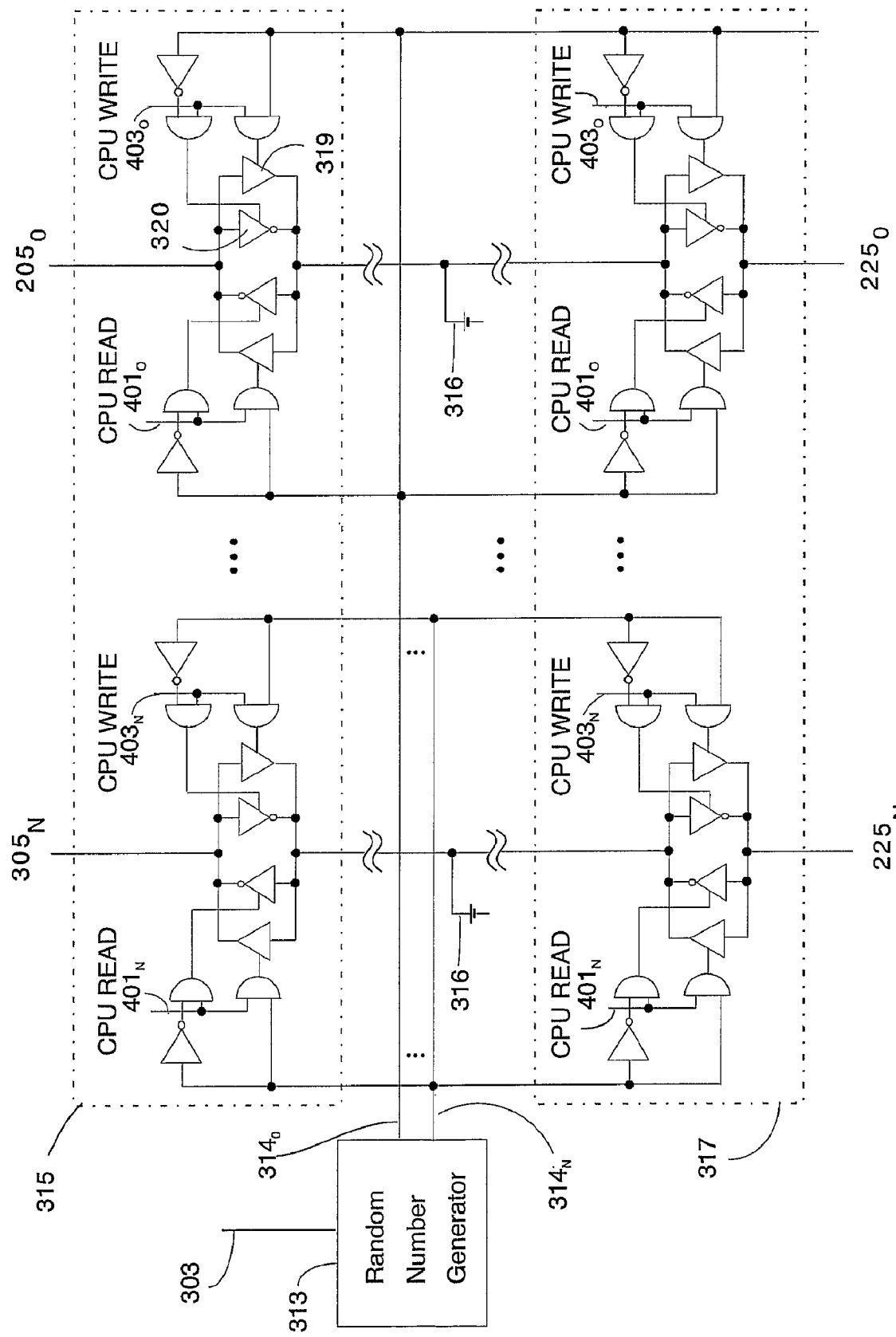
FIG. 13 is a detailed block diagram of a bus architecture in accordance with the cryptographic bus architecture embodiment.

FIGS. 12-14 related to a cryptographic bus architecture which may be used independently or in combination with the other embodiments.

The presently disclosed technology may be embodied in many different forms and should not be construed as being limited to the embodiments set forth herein.

The following discussion provides one context for using the present disclosure in connection with a well-known cipher, the data encryption standard (DES), and thwarting DPA analysis that is commonly used to break DES. Those skilled in the art should appreciate that this discussion is for illustrative purposes only, and that the presently disclosed technology may be utilized to protect secret keys of a number of data encryption formats from a number of hacking techniques in which side channel information is used in order to determine the secret keys.

In general, any encryption algorithm is a series of instructions executed by a processor. While the inputs and outputs of these instructions will vary, the amount of time required to complete each instruction is determined by the clock speed of the processor or a bus over which the data is transmitted to and from the processor. Different instructions take more clock cycles than other instructions. The knowledge of the encryption algorithm used to encrypt/decrypt the data provides hackers with knowledge about the timing of the algorithm, i.e. knowledge about which instructions are used and thus how long each instruction should take. This knowledge about timing can then be used to align side channel information. Thus, the side channel information can then be processed by sophisticated statistical approaches that allow the attacker to break the encryption.

A system and method for randomizing the number of instructions within the encryption algorithm is disclosed herein. By randomizing the number of instructions and by their execution thereby inserting random delay times, the instructions and timing within the encryption algorithm are no longer known to the DPA attacker. Therefore, the timing of the algorithm will be unknown to the attackers and they will be unable to align the side channel information. Without the alignment of the side channel information, the sophisticated statistical approaches will fail and the encrypted information will be protected.

The following discussion illustrates how certain embodiments of the presently disclosed technology may be incorporated with a system using DES to prevent an attack via DPA. One skilled in the art will appreciate that the present invention may be incorporated into other systems that use other encryption algorithms in order to randomize the time between given instructions. This randomization of time may be used to defeat any attack that relies upon understanding the timing of the algorithm in order to break the encryption.

This specification provides information specific to an on-chip Random Instruction Masking (RIM) architecture on a microprocessor that is used to perform cryptographic operations. Furthermore, this specification provides an architectural approach for securing existing cryptographic algorithms (including RSA, DES, AES and non-linear algorithms) from Side-Channel-Attacks—i.e., attacks based on leaked power information. The motivation is to keep systems secure even though the underlying circuits will very likely always be leaking such information.

A software approach to randomizing the order of the processing of the target bit is not enough to secure an algorithm completely. It is also necessary to destroy all instruction signatures or power patterns that may allow the DPA attackers to reorder the target bits to their original sequences. Consequently, one approach is to complement a software approach with hardware protection preferably by means of an architecture that implements the randomizing instructions and time delays as disclosed herein.

Several embodiments of an architectural or hardware approach to prevent DPA attacks from extracting information correlated to secret keys to the DES or other cryptographic algorithm are described below. Moreover, certain background information regarding DES is provided above. If the reader is new to this field, the reader should refer first to the documents mentioned in the introductory portion of this disclosure. In addition, the following illustration is dependent upon a thorough knowledge of the DES algorithm. Comparable detailed knowledge of the appropriate algorithm would be required to attempt an attack on one of the other algorithms. The present discussion starts by discussing the defensive RIM techniques for preventing DPA and related attacks. It is assumed that a DPA selection function can simultaneously select for values of four target bits rather than just one bit because low-level instructions often manipulate four bits (due to common use of six key bits.) The resulting DPA characteristics tend to have larger peaks, but do not have better signal-to-noise ratios because proportionately fewer samples are included in the averaging.

FIG. 3 depicts how the time line relationship between SP box's entry address calculation 131 and the generation of a given 4-bit output target 123 may be modified. The modification comprises the insertion of random numbers of pseudo shifting instructions 133 (according the embodiment of FIG. 5, for example) or random numbers of randomized pseudo instructions in each SP box's entry address calculation subroutine (according the embodiment of FIG. 6, for example).

The numbers of inserted pseudo instructions do not necessarily be random, since if each SP box ends up having the same numbers of real and pseudo instructions, then the attacker is still left with little or not information to ascertain which box is which.

It is desirable that the pseudo shift instructions include the shift and that they exactly mimic the power signature of the real shift instructions. Unless these pseudo instructions include a shift, their effect could probably be observed and thus ignored by a DPA attacker. There is a fixed relationship between the number of shifts and the SP box index (when the presently disclosed technology is not used) and as long as the attacker can identify that number of shifts somewhere, then the attacker can identify the specific SP box being addressed. The attacker can do this via statistical reordering of the data to find the correct number of shifts. In addition to DES, most encryption algorithms do utilize shift instructions somewhere, and assuming that the algorithm is known by the DPA attacker, then a similar correlation can be found unless the disclosed technique of inserting random numbers of shift instructions is utilized.

As shown in FIG. 3, the insertion of the pseudo shifting instructions 133 or other pseudo instructions 133 changes not only the number of instructions run in each SP box's entry address evaluation, but also the time interval between consecutive SP box access T. In the example shown in FIG. 3, a random number of pseudo shifting instructions 133 have been inserted in SP5, thus changing the time interval $T_5$ between the access of SP5 and SP1 compared to FIG. 2b. Further, a random number of pseudo instructions 133 are inserted in SP4, thus changing the time interval $T_4$ between the access of SP4 and SP6 compared to FIG. 2b. Of course, a random number of pseudo shifting instructions 133 could also be inserted in one or more of the other SP boxes. The instructions are called 'pseudo' since they preferably mimic the power consumption trace of a real counterpart instruction (and, indeed, in certain embodiments, they may in fact be real instructions), but the execution of the pseudo instruction does not result in any data being updated by the processor.

Due to the insertion of a random number of pseudo instructions 133 that preferably mimic the real shift instruction from a power use point of view, both the Shifting Instruction signatures and the time interval signatures are camouflaged or even eliminated. This will cause a DPA attacker to be unable to identify which SP box SP1-SP8 is being accessed in the program. This will make the re-shifting (randomization) of the SP box access order an effective way of hiding information from DPA attackers; therefore, they can no longer align different power traces to the same reference for statistical averaging and analysis. If the pseudo instructions exactly mimic real shift instructions from a power use point of view, then the attacker can find it very difficult to identify which SP box is which. If the pseudo instructions mimic a set of randomized instructions, then the SP boxes may well be very difficult to recognize at all. The attacker may well wonder whether the encryption protocol used by the device is the same protocol that the attacker assumes the attacked device utilizes.

Figure 1:
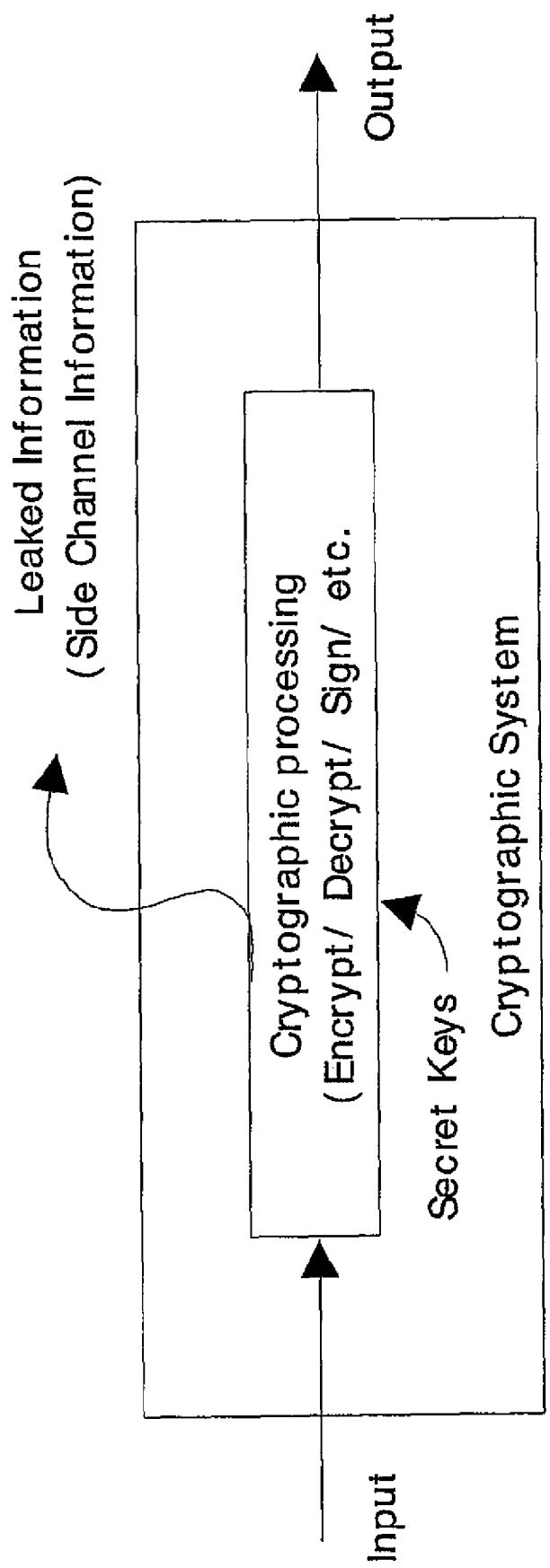
FIG. 1 depicts a prior art diagram of information available to attackers.
Figure 4:
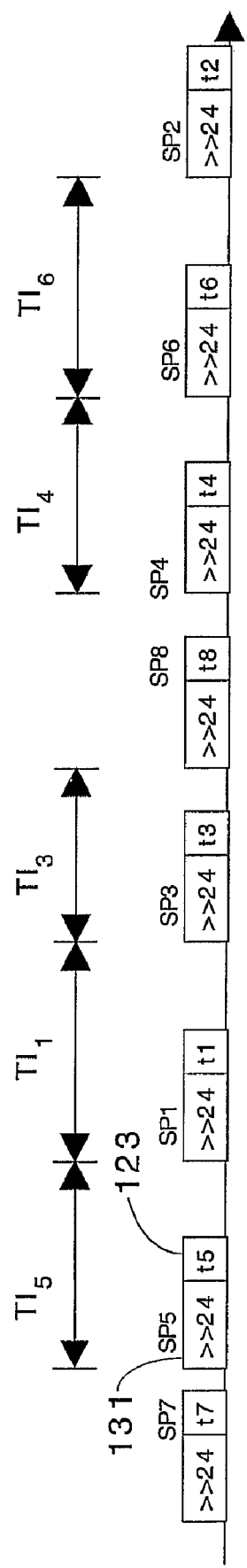
FIG. 4 is a time line with the shifting instructions being equalized in accordance with the present disclosure.

As mentioned above, instead of randomizing the number of shift instructions run in each (or some) SP box's entry address evaluation, it is possible to equalize the number of shift instructions, such that there appears (for example) to be a total of twenty four shifts before each output, as shown in FIG. 4. However, it may be preferable to randomize the number of instructions, which also randomizes the time interval between each consecutive SP box access. Thus, the randomization helps to thwart an attacker's use of the time interval as a signature to identify the SP box access. This added uncertainty further complicates the attacker's task. However, as can be seen with reference to FIG. 4, randomization of the number of inserted pseudo instructions 131 is not critical to the present disclosure.

Detailed Description of a First Embodiment

Figure 5:
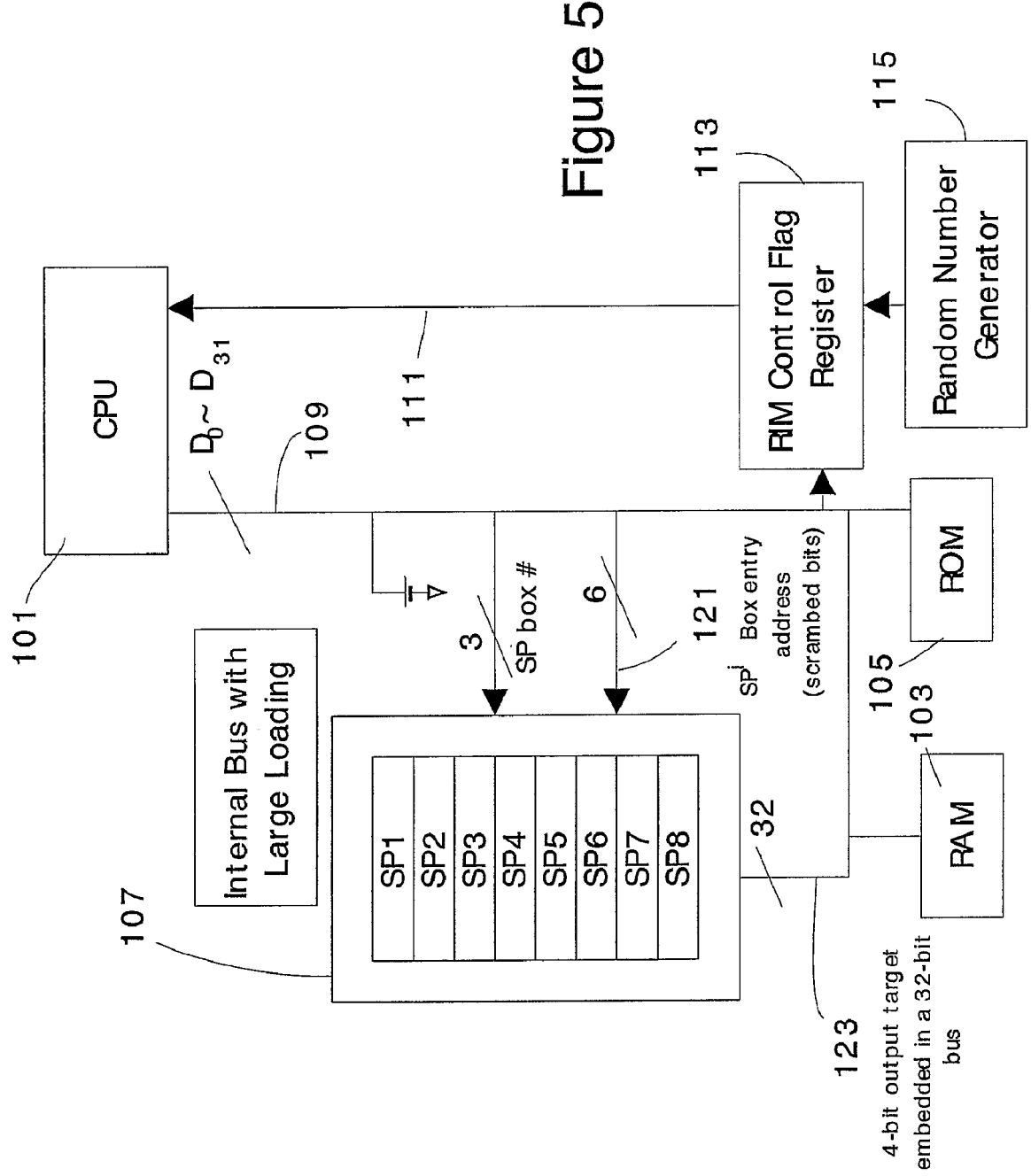
FIG. 5 is a block diagram of a first embodiment of a hardware architecture for implementing the DES algorithm in accordance with the present disclosure.

FIG. 5 depicts a first embodiment of a hardware architecture for implementing the DES algorithm which may be used to insert a random number of pseudo shifting instructions 133 (as discussed with reference to FIG. 3) or an equalized number of shifting instructions 133 (as discussed with reference to FIG. 4). The system illustrated in FIG. 5 includes a 32-bit processor or Central Processing Unit (CPU) 101 with RAM 103 and ROM 105 memories on a single chip. One skilled in the art will appreciate that the presently disclosed technology may be implemented for other hardware architectures such as 2-bit or 8-bit architectures. Accordingly, the CPU could be a 16-bit or 64-bit processor, respectively.

The system also contains substitution/permutation boxes (SP1-SP8) 107, which can be implemented as lookup tables, as discussed above. The CPU 101 runs an encryption/decryption program stored in the ROM 105, while the RAM 103 is for intermediate storage of the cipher text data The 6-bit key (or a guessed key) 121 and SP boxes 107 are used to calculate the Cipher Function $f$. A Random Number generator 115 is coupled to a Random Instruction Mask (RIM) control flag register 113 which is coupled to the CPU 101. In this embodiment, the random number generator 115 and the RIM control flag register 113 are used to camouflage the power trace so that this power trace cannot be time-aligned to yield statistical material for any given 6-bit key 121. Since an attacker is focused on aligning the power trace associated with each 4-bit output target 123 by tracking the shifting instruction signatures, the present RIM approach is devoted to disabling this tracking ability.

A random number of pseudo shifting instructions 133 are generated through the interaction of the CPU 101, the RIM Control Flag Register 113 and the Random Number Generator 115. The CPU 101 runs the encryption/decryption program stored in the ROM 105. Embedded in this encryption/decryption program (to be discussed later) is an instruction to set the RIM Control Flag Register 113. Upon processing this instruction, the CPU 101 sends a signal on bus 109 to the RIM Control Flag Register 113 that sets it. The RIM Control Flag Register 113 then sends a RIM Control Flag signal on a control line 111 to the CPU 101 causing the CPU 101 state machine to halt (to stop updating registers in response to calculations). This may be accomplished by sending a signal from the RIM Control Flag Register 113 to the program counter register within the CPU 101 that will disable the program counter. Effectively, the state machine of the CPU 101 is halted.

The state machine of the CPU 101 remains halted until the RIM Control Flag Register 113 is reset. This will cause the RIM Control Flag Register 113 to send a signal to the CPU 101 on control line 111 to enable the program counter in CPU 101. The RIM Control Flag Register 113 is preferably reset through the use of the Random Number Generator 115. For design simplicity, the Random Number Generator 115 is preferably a 1-bit random number generator. The Random Number Generator 115 is synchronized with the timing of the instruction cycle of the CPU 101. The Random Number Generator 115 may provide an output every clock cycle, or may be gated to ensure that an output is provided to the RIM Control Flag Register after a random number of X cycles, where X is any number such as 5. For a one-bit Random Number Generator 115, the RIM Control Flag Register 113 is programmed to reset when either a zero or one is received from the one-bit Random Number Generator 115 depending upon the logic used. For example, assume that a zero from the one-bit Random Number Generator 115 will reset the RIM Control Flag Register 113. Because the RIM Control Flag Register 113 is reset only after receiving a zero from the one-bit Random Number Generator 115, and the one-bit Random Number Generator 115 will generate a zero after a random number of cycles, the time the state machine of the CPU 101 is halted will also be random. Thus, a random number of pseudo instructions 133 is generated affecting the time line of the algorithm.

Preferably, a pseudo instruction 133 is an instruction producing the same power signature on power traces as the original instruction but the write back of the execution result to the destination register in the CPU 101 is inhibited since the state machine of CPU 101 is halted. The inhibiting of the CPU 101 preserves the CPU's state. Thus, inhibiting write back prevents the CPU from moving onto the next step in the algorithm; however, the power traces suggest otherwise. Thus, the attacker will be unable to use the power traces to decrypt the keys.

The CPU 101 in FIG. 5 is preferably modified to accommodate these pseudo instructions with a RIM control flag signal sent on the bus 111, generated by a RIM control flag register 113, which, when activated, will disable the update of the CPU 101 destination register or the CPU 101 program counter (details of an embodiment of a modified CPU are disclosed in U.S. patent application Ser. No. 10/864,568 filed Jun. 8, 2004 entitled "Cryptographic CPU Architecture with Random Instruction Masking to Thwart Differential Power Analysis").

As a result of this RIM control flag signal on bus 111, all the instructions executed while the state machine of the CPU 101 is halted will have no material effect except to alter the power trace so that the number of discrete samples of a power trace is no longer fixed for a given 4-bit output target 123. While the RIM control flag Register 113 is set a random number of instructions will be executed. When the RIM control flag 111 is reset, the 4-bit output target 123 is supplied to the RAM 103. The introduction of RIM results in the random variation of not only the number of Shifting Instructions run in each SP box's entry address evaluation but also of the time interval between each consecutive SP box access 11. For further details regarding the random instructions executed while the RIM control flag is activated see U.S. patent application Ser. No. 10/864,556 filed on Jun. 8, 2004 and entitled "Cryptographic Bus Architecture for the Prevention of Differential Power Analysis".

A description follows of how the insertion of pseudo shifting instructions works. As shown in Table 2, the DES C language statement #5 (i.e., fval |=SP5[(work>>8) & 0x3fL]) contains an 8-bit right shifting instruction (i.e., "work >>8") as part of the entry address calculation to access the SP5 lookup table. Table 3 shows the expansion of this single C language statement into the corresponding Assembly language subroutine.

The assembly statement #4 (i.e., jal link rshft) in Table 3 jumps and links to the subroutine labeled as "rshft" or Statement #13 (thus the mnemonic jal). The term "link" in this statement represents a register that contains the return address. When the program executes statement #13, i.e. the program counter pc←pc+1, the program counter stops advancing. The program counter tries to prefetch statement #14 but is halted until the RIM control flag is reset by the random number generator 115. The "rshft" subroutine will right shift register 1 by 8 places as specified in the register C. To camouflage the power trace segment associated with the shifting instruction, RIM statements of variable block size (indicated between statement #13 and #14) are inserted before (or after, or both) an actual shifting instruction statement like, #15 (i.e., sra 1 1). The instruction #13 in Table 3 allows the insertion of RIM instructions, when the RIM Control Flag Register 113 is set by the CPU 101 until the RIM Control Flag Register 113 is reset by the Random Number Generator 115. After execution of statement #15, and the completion of the RIM block, the "useful" execution of the program resumes.

The location of statements #13 and #14 in Table 3 are for illustrative purposes only. These statements can occur anywhere, before, between or after an actual shifting instruction statement like #15. Preferably, for design simplicity, statements #13 and #14 are located within the scope of the shifting routine. This random insertion thwarts a DPA attacker's attempt to track the shift instruction signatures because the number of discrete samples of a power trace is no longer fixed, but random. Hence, power traces cannot be time-aligned by the attacker for each 4-bit output target 123. In addition, this insertion of random instructions also changes the time interval, for example TI5, further thwarting the attempts of the DPA attacker. The random number of pseudo shift statements are preferably inserted in the middle of a loop—so the effect of them is magnified by the loop. If these statements were inserted outside the loop, then adding only one or two pseudo shifts really won't help: changing a >>8 to a >>10 may not camouflage it enough in the context of the DES algorithm. If you are trying to hide a >>8 from a >>16 or >>24, this requires that enough pseudo shift instructions be added to confuse the >>8 with a >>16 or a >>24. Putting the added random number of pseudo shift statements in the loop ensures that the added number of pseudo shift statements will be an integer multiple of 8. If a random number of pseudo shift statements is inserted outside the loop, then other techniques can be used to ensure that the added number of pseudo shift instructions will be 8, 16, 24 (or other number sufficiently close thereto to confuse the DPA attacker).

In terms of providing additional information, Table 4 is an assembly language program with a 16-bit CPU to implement the portion of the DES portion of the DES encryption algorithm that performs eight S and P boxes operations in turn by accessing sequentially each lookup table 107 as shown in FIG. 5. Lines starting with ";" are comment lines. Underlined statements are the corresponding C language statements for comment purposes.

Detailed Description of a Second Embodiment

FIG. 6 depicts another embodiment of a hardware architecture for implementing the DES algorithm which may be used to insert a random number of random pseudo instructions 133 (see FIG. 3).

Since a DPA attacker is focused on aligning the power trace associated with each 4-bit output target by tracking the shifting instruction signatures, the first embodiment of FIG. 5 disables this tracking ability by inserting a random number of RIM instructions in each SP box's entry address calculation subroutine. In this embodiment, however, not only the number but also the content of these instructions will be altered, as described in detail below.

This second embodiment, as shown in FIG. 6, is very similar to the first embodiment of FIG. 5 and therefore common elements are identified by common reference numerals. As in the case of the embodiment of FIG. 5, this embodiment preferably has a 32-bit CPU 101 with RAM memories 103 and ROM memories 105 disposed on a single chip. This chip also preferably contains substitution/permutation boxes (SP1-SP8) 107, which can be implemented as lookup tables. The CPU 101 runs the program stored in the ROM 105, while the RAM 103 is for intermediate storage of the cipher text data. In this embodiment, the CPU 101 fetches not only the normal encryption program from the ROM 105, but also the camouflaged, randomized instructions by means of a 32-bit pseudo random number generator 117. As shown in FIG. 6, a MUX 119, selected by a RIM control flag register 113, determines the type of instructions fetched by the CPU 101, real instructions from ROM 105 or randomized instructions generated by the 32-bit pseudo random number generator 117.

As in the case of the first embodiment, a conventional CPU is modified to include the RIM control flag register 113 which, when activated, will disable the update of the CPU's destination register(s). As a result of this flag being set, all the instructions executed inside the RIM statements block will camouflage the power trace so that the number of discrete samples of a power trace is no longer fixed for a given 4-bit output target. The number and type of these instructions are determined on the fly by the random number generators. The program address is also constantly being substituted for by another 32-bit pseudo Random number, since the Program Counter is not updated until the CPU resumes normal execution after the RIM control flag has been reset by the 1-bit random number generator.

The RIM control line 111 of FIG. 5 or 6 should be made to be "probe-proof" by burying it deeply in the layers of the semiconductor device. However, if the RIM control line 111 can be probed, then the afore-described techniques for dealing with a DPA attack will be overcome if the DPA attacker disables the RIM control signal on line 111 by tying it to ground (or high, depending on its logic) throughout the attack.

Detailed Description of a Third Embodiment

Figure 8:
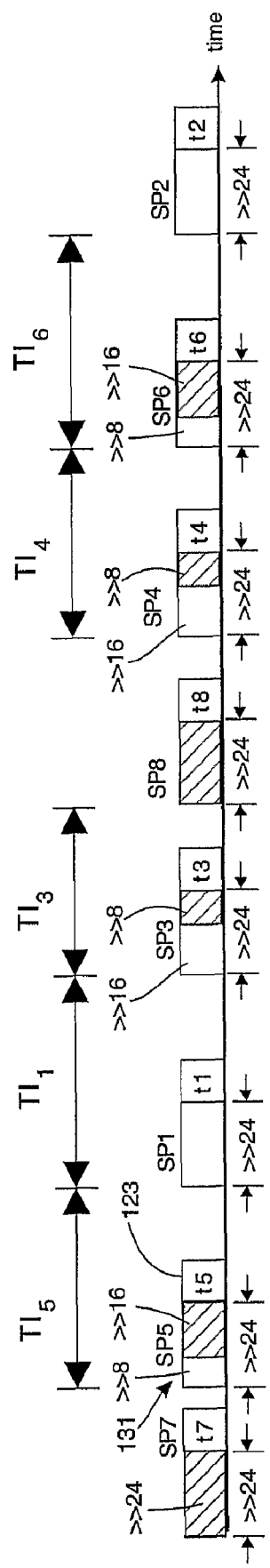
FIG. 8 is a time line associated with the embodiment of FIG. 7.

FIG. 7 depicts a third embodiment that is more resistant to probing than the embodiments of either FIG. 5 or 6 and FIG. 8 presents a time line for this embodiment. This embodiment overcomes a single point failure attack, that is, an attack on line 111 of the foregoing embodiments, by introducing a Shift Control Counter (SCC) 140 and other changes discussed below. This embodiment is described with reference an embodiment in which the total number of shift instructions (both real and pseudo) are fixed at twenty-four in number. However, those skilled in the art should now appreciate that the number of fixed and real instructions can be fixed at some other number or can be randomized utilizing the techniques previously described with reference to FIGS. 5 and 6. The embodiment of FIG. 7 anticipates an attack will occur on line 111 and the previously disclosed design of line 111 is modified so that even in the event of a successful attack, the system does not revert back to an unprotected design (such as the designs described with reference to FIGS. 2a and 2b).

During the calculation of a given SP box's entry address, as defined in the Data Encryption Standard (DES) algorithm, the SCC 140 will be set (for example by a suitable software instruction or set of software instructions—see, e.g., instructions 3 and 4 in Table 5) to a count corresponding to that of the SP box. Each decoded shift instruction will decrement this counter 140 by one until it reaches zero using, for example, its own decoder hardware. A zero count will activate the "RIM_shift" signal at its output that will make any subsequent shift instruction a RIM instruction (i.e., a pseudo shift instruction with a camouflaged power signature). In FIG. 8, each SP box has 24 right bit shifts associated therewith. However, some or all of the right bit shift instructions are RIM shifts (i.e. pseudo shifts). The shifts, which are pseudo shifts in FIG. 8, are identified by hatching lines. For example, for box SP5, eight shifts are real right bit shift instructions while sixteen shifts are pseudo shift instructions. If a DPA attacker attacking line 111 disables the "RIM_shift" signal, then the normal execution of the encryption algorithm will be disrupted due to the fact that extra shifts will be performed because the pseudo shift instructions are then turned into real instructions due to the interference with line 111. This instead of merely inhibiting the production of pseudo shift instructions, interference with line 111 causes the inhibited pseudo shift instructions to be replaced with real shift instructions.

Therefore, the attacker can gather no useful statistical key material. In other words, disturbing the RIM flag will disrupt the normal execution of the encryption algorithm and DPA attack fails as it yield correct results (due to the extra real shifts which occur). On the other hand, if the DPA attacker leaves the "RIM_shift" signal alone, the activated "RIM_shift" signal will camouflage the shift instructions' power signatures as previously described with reference to FIG. 5 or 6. This means then, that the randomizing of the SP box accessing order will be an effective way to thwart a DPA attacker's attempt because the grouping and reordering of target bits required by DPA is made much more difficult.

Table 5 is similar to Table 3, but shows the SCC 140 augmented RIM implementation in an assembly language subroutine. The same assembly statement #3 (in an italic font) first loads register C with the number of shifts to be used to initialize Shift Control Counter (SCC) as indicated by the assembly statement #4 (i.e., sw SCC C) which stores word SCC with the content of register C (thus the mnemonic sw). Assembly statement #3 is not intended to tell the CPU to execute how many shifts; instead, assembly statement #5 is used for this purpose to provide identical shifting instruction power signatures for every SP box access. The SCC control circuitry will decode each shifting instruction and decrement its counter until it reaches zero. The zeroed SSC counter will then convert subsequent real shift instructions into pseudo instructions by asserting "RIM_shft" signal to camouflage their power signatures. A non shifting instruction will never activate the "RIM_shft" signal. SCC circuitry will only be active when it is running encryption algorithm during SP box access, so that normal shift instruction decoding is in effect for non-SP box operations.

The physical protection of the RIM control line 111 on the chip from direct probing is no longer critical (although it would make sense to protect it nevertheless in order to make the DPA attacker think he will obtain meaningful results by attacking it—something which will turn out to be an exercise in futility). So some knowledgeable attackers may be able to force the RIM control line 111 to be always at logical '0' (whether it is physically protected or not) so as to disable the RIM. In this embodiment, the DPA attack of the chip is protected by a novel approach—the conversion of unnecessary pseudo shifts into real shifts that just render the data meaningless.

In summary, the principle of DPA is to calculate and plot the difference of the sum of two groups of power traces. DPA can be effective due to the fact that there is a statistical correlation between the difference of the sum of the two groups of power traces and the content of a target bit (b) getting through the data path of the system at a specific order. Because of the introduction of SCC augmented RIM in this embodiment, this statistical correlation is no longer valid as target bits are now getting through the data path of the system at a random order rather than at a specific order, and it cannot be disabled without disrupting normal execution of the encryption algorithm. Disruption of encryption algorithm by attacking the RIM control line yields no useful statistical key material to be gathered by the attacker.

DPA can only be effective if there is a statistical correlation between the difference between the sums of two groups of power traces and the content of a single target bit that exits the system at a specific time. With this RIM embedded embodiment, this statistical correlation is no longer valid due to the fact that target bits now exit the data path of the system at random rather than at specific times. The introduction of embedded RIM results in the random variation of two features. The first is a variation in the number/type of instructions run in each SP box's entry address evaluation. The second is a variation in the time interval between each consecutive SP box access. These two features will cause a DPA attacker to be unable to identify which SP box is being accessed in the program. This will, in turn make the re-shuffling of the SP box access order an effective way of hiding information from DPA attackers because they can no longer align different power traces to the same reference for statistical averaging and analysis.

In the embodiment of FIG. 7, the total number of real and pseudo shifts associated with each SP box totals twenty four shifts. For example, for box SP5 in FIG. 8, eight real shifts are associated with sixteen pseudo shifts. The eight real shifts are the correct number of shifts for box SP5 according to the DES algorithm. If line 111 is attacked, then twenty four real shifts will occur in box SP5 instead (and in the other SP boxes as well), making a "mess", to so speak, of the DES algorithm.

In FIG. 7 the pseudo shifts are shown as occurring after the real shifts, but the order can be changed, if desired, so that the pseudo shifts would occur before or even mixed among the real shifts.

Detailed Description of a Fourth Embodiment

The total number of shifts in each SP box need not be fixed at twenty four (or some other number, for that matter), but may be varied or randomized, if desired. That complicates the design of the CPU shown in FIG. 7 somewhat, for example, by incorporating the design of either FIG. 5 or 6, but the modification needed to randomize the total number of shift instructions is rather straightforward, as can be seen by reference to FIG. 9 which shows a fourth embodiment as combination of the embodiments of FIGS. 6 and 7.

Detailed Description of a Fifth Embodiment

A modified RISC Processor (CPU) architecture can be used, for example, to generate identical power signatures for both normal instructions and special camouflaged "pseudo" instructions controlled by the Random Instruction Masking (RIM) flag. This specific processor architecture is intended to work in an on-chip cryptographic system embedded with Random Instruction Masking (RIM), and this architecture combined with the S/W-specific RIM concepts, is intended to protect the cryptographic system from piracy through Power Analysis and Differential Power Analysis. Camouflaged instructions are those instructions that have the same instruction code and the same power signature as those typically used in encryption, but when running in this specific processor architecture, will not change the content of any processor register or alter the processor status. The Random Instruction Masking is a technique to create a camouflaged encryption program to protect the cryptographic device from reverse engineering through Power Analysis or Differential Power Analysis.

Figure 10:
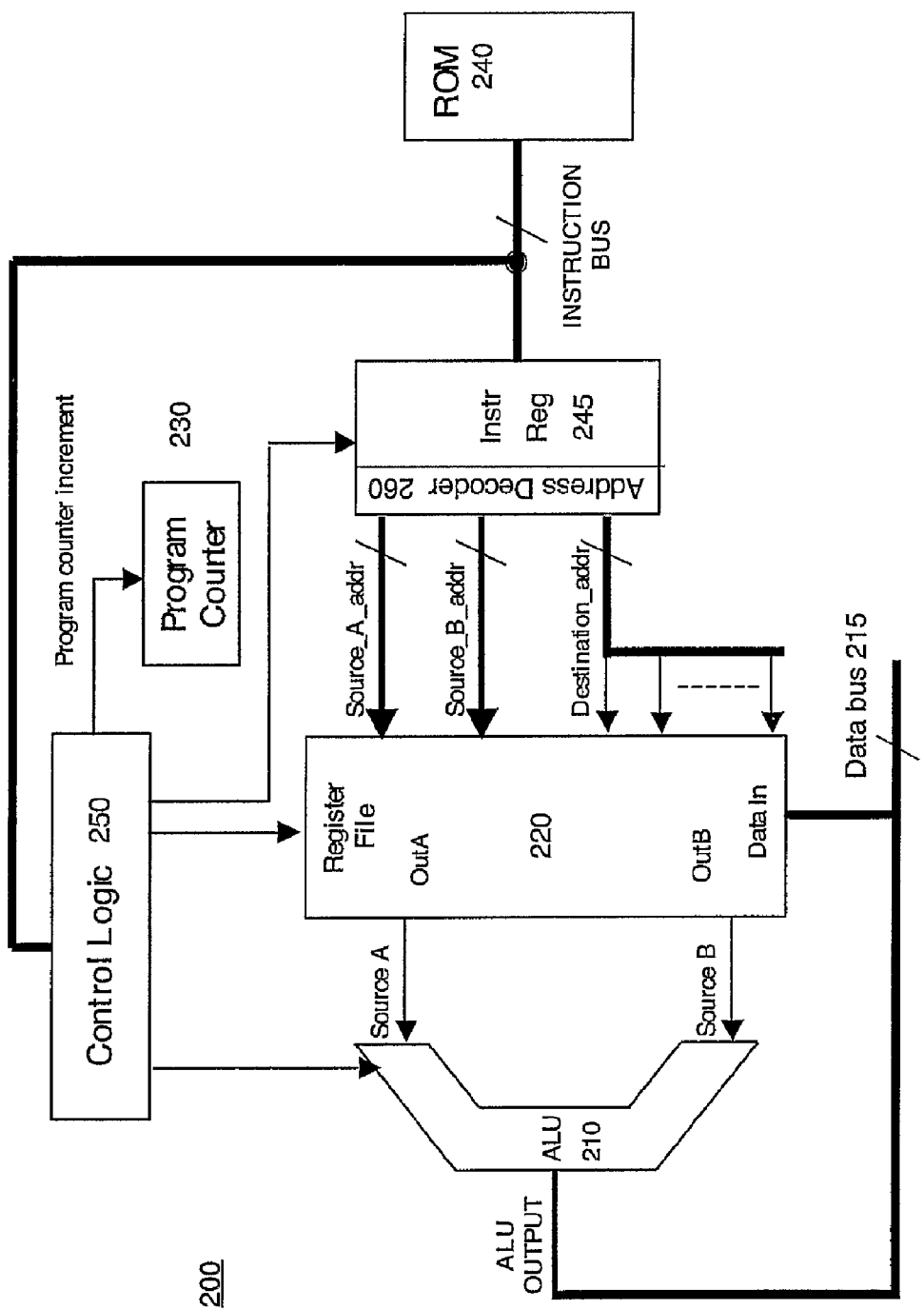
FIG. 10 is a block diagram a prior art RISC CPU.

FIG. 10 is a general (simplified) RISC Processor (CPU) architecture 200. A RISC instruction is an arithmetic or logic function performed by the ALU (Arithmetic Logic Unit) 210 taking two operands from two registers of the Register File 220 and the result of the operation being written back into a third register of the Register File 220 The Register File 220 consists of a number of registers with the same width (number of bits, e.g. 32-bits) that can be accessed with an address selection. In each instruction cycle, the processor gets its instruction sequentially from the ROM 240 and loads it into the Instruction Register 245. The ROM 240 stores all the instruction codes of the whole program including the encryption algorithm. The Control Logic 250 decodes the instruction code in the Instruction Register 245 and gives the correct control commands to the ALU 210 and other parts of the processor 200. Addresses of the operands (Source A and B) and the destination are also defined in the instruction code. An address decoder 260 decodes the address information from the Instruction Register 245 and provides the access control of the specific register in the Register File 220. The ALU 210, controlled by the Control Logic 250, gets the two operands (sources A and B) from the register file 220 with the specified addresses and performs the instruction-specified arithmetic or logical operation. The result of the ALU operation is written back to another register in the Register File 220 with the destination address on a data bus 215. Depending on the type of instructions, a Program Counter 230 that stored the index reference of the instruction in the whole program will be incremented or updated by the Control Logic 250 during the execution of the instruction. Some specific instructions of the processor will not increment or update the Program Counter 230. The updating of some other Flag Registers (not shown) in the processor, similar to the Program Counter 230, is also instruction dependent.

Most modern processors are built in CMOS technology. CMOS circuits do not draw static current so that power is dissipated only when charging and discharging of the load capacitance (switching). The current consumption of a CMOS circuit depends mainly on the capacitive loading, the driving capability of the driver and the frequency of the switching. A complete instruction cycle run in the processor involves the operation of different circuits at different times. Different parts of the processor circuits, due to their differences in device dimension, parasitic loading, and switching speed, will generate a unique current pattern (power signature) with respect to time on the power bus when activated. Power Analysis or Differential Power Analysis (DPA) uses these power signature patterns to correlate the instructions.

An embedded Random Instruction Masking (RIM) approach is used to randomly vary both the number and also the content of the RIM instructions in each SP box's entry address calculation subroutine as disclosed above. One very important condition for the RIM approach to successfully prevent DPA attacks is to eliminate any power signature of these RIM instructions. The best way to do this is to make the power signature of the RIM instruction identical to the normal instruction so that they are not differentiable in Power Analysis or Differential Power Analysis (DPA). FIG. 11 shows an improved version of the RISC Processor 200 shown in FIG. 10. A RIM control flag 202 generated from a random number generator 223, for example, controls the activation of the REM instructions. The random number generator is also depicted in FIG. 5 in connection with the first embodiment. The RISC Processor of FIG. 11 has extra AND gates compared to the Processor of FIG. 5 for controlling the Destination Address and the Program Counter Increment Enable. An extra register 222 is attached to the data bus 215. This register 222 is designed in such a way that it is identical to a register in the Register File 220 at least from a power consumption viewpoint. A pseudo program counter 232 is also present to duplicate the original Program Counter 230 in the processor in terms of power consumption. While the RIM control flag 202 is set, the pseudo program counter 232 fetches instructions from the ROM 240 and those instructions enter the Instruction Register 245 and are decoded by the Address Decoder 260 as usual. But the results of the instruction are directed to the additional register 222 instead of a register in the Register File 220.

When the RIM control flag 202 equals a logical '0', the processor 200 will be under normal operation (that is, it functions as depicted by FIG. 5 as unmodified). The extra AND gates 221, 231 at the destination address and the program counter just passing the original signals from the Address Decoder 260 and the Control Logic unit 250. At the same time, the added register 222 and the pseudo program counter 232 are disabled, Since all the circuit components involved during the execution of an instruction are the same as in FIG. 10, the power signature (i.e. the consumed current pattern with respect to time) of every instruction run in the modified processor of FIG. 11 will be the same as the processor of FIG. 10.

When the RIM control flag 202 is activated (equal to logical '1'), fetching an instruction from ROM 240, decoding and sourcing the A and B operands from the register file 220, and the operation of the operands in ALU 210 continues on as usual. However, due to the presence of AND gates 221, which are responsive to the state of the RIM flag 202, disable the selection of the destination register in register file 220, none of the destination registers in the register file 220 is selected to receive the results from the ALU 210. Rather, AND gate 223 causes the data on data bus 215 from ALU 210 to be directed to extra register 222 instead. The result is that the ALU is directed to load the results of the instruction being executed into added register 222 instead of one of the normal destination registers in register file 220. Since the physical design of the added register 222 is identical to a destination register in register file 220, the consumed current pattern of loading this added register 222 will be the same as loading the results into a real destination register in the register file 220. The AND gate 223 arranged at the front of the added register is for the purpose of emulating the power of one AND gate 221 used to select one of the destination registers during normal operation. At the same time, the RIM flag 202 also disables the real Program Counter 230, and the pseudo program counter 232 is activated to be incremented or updated. Again, because of the identical physical design between the two program counters 230, 232, the power pattern of incrementing or updating the program counter by the executed instruction will be maintained. At the end of such an instruction cycle, none of the contents in destination registers in register file 220 or the real program counter 230 is modified. That is, the status of the processor 200 remains the same as before this instruction is being executed while the RIM flag 202 is set. When the RIM flag 202 is set, the processor 200 acts, from a data processing standpoint as if it were processing NOP (no operation) instructions. But from a power consumption standpoint, the processor appears to be processing real instructions.

When RIM flag 202 goes back to logical '0', the processor will resume its normal operation to continue running the original program. Whatever instructions (no restriction of what kind) run during RIM flag at logical '1' have no effect on the processor nor the programming other than just producing a camouflage effect of executing an associated normal instruction in the power trace. Thus, the instructions that were fetched when the RIM flag at a logical '1' are basically re-fetched. Of course, the sequence my vary somewhat since the outcomes of branch instructions could be different. In any event, the processing basically continues from where it was interrupted while the RIM flag at a logical '1'. When this processor with the RIM flag controlled instructions in the SP box address calculation subroutine is used, then the power traces will contain a random variation of the number of certain instructions and also a variety of different kinds of instructions executed in the subroutine. Thus, DPA attackers can no longer identify and align the power traces of the SP box subroutine.

The extra register 222 is a dummy register in that it receives and stores data, but the data received thereby is preferably not used to influence subsequent data processing by processor 200. In FIG. 11 it is shown separated from register file 220, but it could be implemented as a part of register file 220, if desired.

The protection of the RIM control line at the output of the RIM control flag 202 on the chip from direct probing is important. If the RIM control line were easily accessed, some knowledgeable attackers may use this technique to force the RIM control line to be always at logical '0' so as to disable the RIM. A number of camouflage techniques are available to protect the physical design of CMOS circuits from reverse engineering. Using these techniques, the RIM control line can be made very difficult to probe by burying it deep into the silicon implant level and shielding it with actively connected higher Poly and metal layers. It will be very difficult to locate this RIM control line and any attempt to remove the higher protecting layers will damage the functionality of the chip.

The state of the RIM flag 202 is assumed to be at a logical '1' when the pseudo program counter 232 is being used to fetch instructions. As is well known to those skilled in the art, this logic shown on FIG. 11 may be easily modified so the a logical '0' would cause the pseudo program counter 232 to come into play and then a logical '1' would represent normal CPU operation.

The circuit shown in FIG. 11 is not intended for a pipelined ALU. However, it is straightforward to adapt the circuit of FIG. 11 for a pipelined ALU. In general, a pipelined ALU has four stages: prefetch, instruction decode, execute, and writeback. The RIM control signal from the RIM flag may be synchronized with the pipeline through a delay circuit. Thus, the RIM control flag 202 should be synchronized with added register 222, AND gates 221 and pseudo program counter 232 when used with a pipelined ALU.

Of course, a processor 200 may have additional status flag registers that should not be updated when running in RIM mode. The control of such registers may be modified in the same way as the registers (by providing dummy flag registers analogous to extra register 222—for writing results to when in RIM mode) resulting in a duplicated power signature component for updating these flag registers without really updating them. These flag registers are not depicted in FIG. 11 for the purpose of simplicity.

Within a processor, high capacitive loading and high speed mean that the switching of the data bus and the read/write of the Register File (Memory) will dominate the power consumption. The switching power of updating the flag registers (usually single-bit registers) is not significant in comparison to the total power. Even the program counter switching power may not be significant enough to cause an observable difference in the power traces. Leaving these flag registers untouched may be a convenient way to reduce the extra circuitry required.

Detailed Description of a Bus Architecture Embodiment

This embodiment prevents usage of side channel information by DPA attackers by randomly toggling the polarity of the target bit at the data bus driver while maintaining the equal probability of having a '0' or '1' values. In other words, the power traces no longer statistically correlate with the secret key. Thus, side channel information cannot be used to determine thekeys being used by the cryptographic system. This embodiment may be used with the other embodiments or may be used alone.

Specifically, with reference to DPA, the result is that within each group of messages having the same target bit values computed from the selection function with correctly guessed key $K_s$, the corresponding power traces will not be always '0' or '1'. The chance of having a '0' or '1' at the target bit will be approximately at 0.5 due to the randomization of polarity.

Thus, the selection function D is effectively un-correlatable to the actual power trace measurement. The selection function D has thus been deprived of a way of predicting the power consumption of the actual target bit. In the case of $K_s$ being incorrectly guessed, randomization will maintain the un-correlation between D and the corresponding power traces.

FIG. 12 depicts a Cryptographic Bus Architecture 311 (CBA) in accordance with the present invention, preferably having bi-directional drivers 315, 317 at both ends and a typically heavily loaded bus 316 in between. Bi-directional drivers are preferred since the use of non-bi-directional drivers would tend to increase the number of bus drivers needed to practice the invention. The bus 311 connects CPU 301 to its memories 321, 323. The CPU 301 runs the program stored in the ROM 321 and the RAM 323 is for intermediate storage of the cipher text data and the key.

The N-bit random number generator 313 controls the N-bit bi-directional drivers 315, 317. The random number generator 313 has N outputs 314, wherein each output comprises of one bit. Each bit $314_0$-$314_N$ controls one bus driver 315, 317. The random number generator 313 generates a new set of N-bit random numbers 3140-314N whenever an "activate signal" is received from the CPU 301 though the enable line 303. The activate signal is preferably sent by the CPU 301 at the beginning of each DES round and is preferably software invoked. The value of each random bit $314_0$-$314_N$ is used to determine the way to toggle a driver 315, 317, i.e. change its polarity, and drive the heavily loaded internal data bus 316 so as to defeat correlation. The polarity control line 313 is preferably made to be "probe-resistant" because it is preferably buried beneath those circuit features readily visible to the reverse engineer. That is, this control line can be made with implanted layers in the substrate, using the techniques of U.S. Pat. Nos. 5,866,933; 6,294,816 or 6,613,661 (each of which is hereby incorporated herein by reference), and therefore is buried beneath oxide, polysilicon and/or metal, making the possibility of connecting to the control line a much more difficult proposition. The required polarity changes are infrequent enough to thwart the statistical analysis by a reverse engineer. For example, the polarity can be changed at the beginning of each DES round, or at the beginning of fetching each new plaintext for encryption.

FIG. 13 depicts a more detailed block diagram of the preferred embodiment. The 'CPU Read' $401_0$-$401_N$ and 'CPU Write' $403_0$-$403_N$ lines are used to control the data flow direction. The bi-directional bus drivers 315, 317 are inverting or non-inverting tri-state buffers determined by the value of the associated random bit $314_0$-$314_N$ if the random number generated by random number generator 313. For example when the random bit $314_0$ is '0' for bi-directional bus driver 315 during a 'CPU write' operation, the signal at $305_0$ will be inverted on the data bus 316. At the other end, bi-directional bus driver 317 will pick up the inverted signal from the data bus 316 for bit $305_0$ and invert the bit again to ensure the integrity of the original data signal. This occurs for each bit of the data signal 305, typically with some bits being inverted and others not. For the case when the bit $314_0$ is a random '1', the non-inverting buffer 319 will drive the data bus 316 instead of the inverting one 320. Since the signals $314_0$-$314_N$ are random, the chance of having a value of '0' or '1' will be approximately 0.5 and 0.5. The result is that all the deterministic power information associated with the content of the data bus will be lost. Thus, even in the case of a DPA attack having a correctly guessed key, the tip-off correlation between the content of the target bit over the data bus and the corresponding power traces is lost.

After the logical content of a data bus 316, which tends to have heavy capacitive loading in processor designs, is made un-correlatable to a power trace measurement, any remaining correlation could be coming from the lightly loaded capacitive wires connecting the ALU and register files. To minimize detection of this correlation, a set of dual rails (d and d_bar) is preferably used to write a given register bit as shown in FIG. 14. Because of the symmetry of this design, the dual rails simultaneously contain both the new data 'd' and its complement 'd_bar', thus masking the external power consumption to be normalized at 0.5 as a result of averaging and 'd_bar'. Note that the presence of complementary read amplifiers and complementary write amplifiers. Specifically, for a data value $D_o$ of '0', the set of dual rails contains '0,1'; for a data value $D_o$ of '1' the data value for the set of dual rails is '1,0'. Therefore, independent of the data value $D_o$, this circuit (including the rails d and d_bar as well as the complementary read and complementary write amplifiers will always have the same average power consumption and thus will make the data value $D_o$ un-correlatable to the power consumption of the circuit. The data value $D_o$ of the circuit of FIG. 14 can have a '0' value or a '1' value, but, in either case, one of d and d_bar will be equal to "0" and the other of d and dbar will be equal to '1' and their average will, of course, be equal to 0.5. The result is that the power signature of the circuit is independent of the data value content of the ALU register bit. Of course, a given register has multiple bits and each bit of storage is preferably constructed in accordance with the design according to FIG. 14.

The present invention is preferably implemented in an on-chip bus and/or chip architecture of a microprocessor that is used to perform cryptographic operations. This architectural approach enables securing existing cryptographic algorithms (including RSA, DES, AES and non-linear algorithms).

Having described the presently disclosed technology in connection with different embodiments thereof, modification will now suggest itself to those skilled in the art. As such, the invention as defined in the appended claims is not to be limited to the disclosed embodiments except as specifically required by the appended claims.

TABLE 1

Expressed in C language, for example, SP-Box 1 & 2 are implemented as lookup tables of 64 elements

```
static unsigned long SP1[64] = {
    0x01010400L, 0x00000000L, 0x00010000L, 0x01010404L, 0x01010004L,
0x00010404L, 0x00000004L, 0x00010000L,
    0x00000400L, 0x01010400L, 0x01010404L, 0x00000400L, 0x01000404L,
0x01010004L, 0x01000000L, 0x00000004L,
    0x00000404L, 0x01000400L, 0x01000400L, 0x00010400L, 0x00010400L,
0x01010000L, 0x01010000L, 0x01000404L,
    0x00010004L, 0x01000004L, 0x01000004L, 0x00010004L, 0x00000000L,
0x00000404L, 0x00010404L, 0x01000000L,
```

TABLE 1-continued

Expressed in C language, for example, SP-Box 1 & 2 are implemented as lookup tables of 64 elements

```
    0x00010000L, 0x01010404L, 0x00000004L, 0x01010000L, 0x01010400L,
0x01000000L, 0x01000000L, 0x00000400L,
    0x01010004L, 0x00010000L, 0x00010400L, 0x01000004L, 0x00000400L,
0x00000004L, 0x01000404L, 0x00010404L,
    0x01010404L, 0x00010004L, 0x01010000L, 0x01000404L, 0x01000004L,
0x00000404L, 0x00010404L, 0x01010400L,
    0x00000404L, 0x01000400L, 0x01000400L, 0x00000000L, 0x00010004L,
0x00010400L, 0x00000000L, 0x01010004L };
    static unsigned long SP2[64] = {
    0x80108020L, 0x80008000L, 0x00008000L, 0x00108020L, 0x00100000L,
0x00000020L, 0x80100020L, 0x80008020L,
    0x80000020L, 0x80108020L, 0x80108000L, 0x80000000L, 0x80008000L,
0x00100000L, 0x00000020L, 0x80100020L,
    0x00108000L, 0x00100020L, 0x80008020L, 0x00000000L, 0x80000000L,
0x00008000L, 0x00108020L, 0x80100000L,
    0x00100020L, 0x80000020L, 0x00000000L, 0x00108000L, 0x00008020L,
0x80108000L, 0x80100000L, 0x00008020L,
    0x00000000L, 0x00108020L, 0x80100020L, 0x00100000L, 0x80008020L,
0x80100000L, 0x80108000L, 0x00008000L,
    0x80100000L, 0x80008000L, 0x00000020L, 0x80108020L, 0x00108020L,
0x00000020L, 0x00008000L, 0x80000000L,
    0x00008020L, 0x80108000L, 0x00100000L, 0x80000020L, 0x00100020L,
0x80008020L, 0x80000020L, 0x00100020L,
    0x00108000L, 0x00000000L, 0x80008000L, 0x00008020L, 0x80000000L,
0x80100020L, 0x80108020L, 0x00108000L };
```

TABLE 2

C language program that sequentially accesses DES's eight SP lookup tables for a given round.

1. {
2. work = (right << 28) | (right >> 4);
3. work ^= *keys++;
4.     fval = SP7[ work & 0x3fL];
5.     fval |= SP5[(work >> 8) & 0x3fL];
6.     fval |= SP3[(work >> 16) & 0x3fL];
7.     fval |= SP1[(work >> 24) & 0x3fL];
8.     work = right ^ *keys++;

TABLE 2-continued

C language program that sequentially accesses DES's eight SP lookup tables for a given round.

9.     fval |= SP8[ work & 0x3fL];
10.    fval |= SP6[(work >> 8) & 0x3fL];
11.    fval |= SP4[(work >> 16) & 0x3fL];
12.    fval |= SP2[(work >> 24) & 0x3fL];
13.    leftt ^= fval;
14. }

TABLE 3

The corresponding Assembly language program to implement the C program statement #5 of Table 2 - lines start with ";" are the comment lines. The C language statement fval |= SP5[(work >> 8) & 0x3fL] becomes, in assembly language:

| # | op | operands | comment |
|---|---|---|---|
| 1. | li | A 0x3f | ; A = 0x3f |
| 2. | add | 1 work 0 | ; 1 = work |
| 3. | li | C 8 | ; C = 8 ; initialize shifting counter to 8 |
| 4. | jal | link rshft | ; jump to Subroutine to right shift register 1 by C (reg.) places; 1 = (work >> 8) |
| 5. | and | 1 1 A | ; 1 = (work >> 8) & 0x3fL |
| 6. | li | B SP5 | ; B = &SP5 |
| 7. | add | B B 1 | ; B = &SP5[(work >> 8) & 0x3fL] |
| 8. | Lw | B B | ; B = SP5[(work >> 8) & 0x3fL]; |
| 9. | Lw | C fval | ; C = fval |
| 10. | or | C C B | ; fval = C |= SP5[(work>> 8) & 0x3fL]; |
| 11. | sw | fval C | ; fval = C |
| 12. | ; "rshft" is the routine to right shift register 1 by C (reg.) places with Random Instruction Masking (RIM) enabled | | |
| 13. | rshft sw | RIM_start | ; I/O to start RIM by allowing insertion of random instructions with CPU ; registers update disabled. (i.e., begin of RIM statements block) |
| | | ... | ; random instruction from random number generator |
| | | ... | ; random instruction from random number generator |
| 14. | sw | RIM_stop | ; I/O to stop Random Instruction Masking by enabling update of registers; ; (i.e., end of RIM statements block) |
| 15. | sra | 1 1 | ; register 1 is shifted right by one place |
| 16. | sub | C C const1 | ; C--; decrement count register by one |

TABLE 3-continued

The corresponding Assembly language program to implement the C program statement #5 of Table 2 - lines start with ";" are the comment lines. The C language statement fval |= SP5[(work >> 8) & 0x3fL] becomes, in assembly language:

| 17. | bnz | C rshft | ; (C > 0) loop |
| 18. | jr | link | ; return to caller |

TABLE 4

| 1. | ; | for( round = 0; round < 8; round++ ) { | |
| 2. | ; |     works[0] = (rights[1] << 12) | ((rights[0] >> 4) & 0x0fff); | |
| 3. | ; |     works[1] = (rights[0] << 12) | ((rights[1] >> 4) & 0x0fff); | |
| 4. | li | round 0 | ; round = 0 |
| 5. | li | A edf | ; A = edf |
| 6. | Lw | B A | ; B = &edf |
| 7. | Lw | C B | ; C = edf |
| 8. | li | A keys | ; A = keys, .i.e. en0ks |
| 9. | add | A A C | ; A = en0ks + edf |
| 10. | Lw | j A | ; j = &keys //initialize the pointer to the key schedules |
| 11. | mdbk4 | li   A desmsk | ; A = desmsk |
| 12. | Lw | A A | ; A = &desmsk[0] |
| 13. | li | B 4 | ; B = 4 |
| 14. | add | B B A | ; B = &desmsk[4] |
| 15. | Lw | fval0 B | ; fval0 = desmsk[4] = 0x0fff |
| 16. | li | A 0 | ; A = 0 |
| 17. | add | 1 right0 A | ; 1 = right0 |
| 18. | li | C 4 | ; 1 = (rights[0] >> 4) |
| 19. | jal | lnk rshft | ; |
| 20. | and | work0 1 fval0 | ; work0 = (rights[0] >> 4) & 0x0fff |
| 21. | add | 1 right1 A | ; 1 = right1 |
| 22. | li | C 12 | ; 1 = (rights[1] << 12) |
| 23. | jal | lnk rtls | ; |
| 24. | or | work0 work0 1 | ; |
| 25. | add | 1 right1 A | ; 1 = right1 |
| 26. | li | C 4 | ; 1 = (rights[1] >> 4) |
| 27. | jal | lnk rshft | ; |
| 28. | and | work1 1 fval0 | ; work1 = (rights[1] >> 4) & 0x0fff |
| 29. | add | 1 right0 A | ; 1 = right0 |
| 30. | li | C 12 | ; 1 = (rights[0] << 12) |
| 31. | jal | lnk rtls | ; |
| 32. | or | work1 work1 1 | ; |
| 33. | ; |     works[0] ^= *keys++; | |
| 34. | ; |     works[1] ^= *keys++; | |
| 35. | Lw | C j | ; C = *keys++ |
| 36. | add | j j const1 | ; j++ |
| 37. | xor | work0 C work0 | ; works[0] ^= *keys++ |
| 38. | Lw | C j | ; C = *keys++ |
| 39. | add | j j const1 | ; j++ |
| 40. | xor | work1 C work1 | ; works[1] ^= *keys++ |
| 41. | ; |     fvals[0] = SP7LL[ works[1] & 0x3fL] ; | |
| 42. | ; |     fvals[1] = SP7RR[ works[1] & 0x3fL] ; | |
| 43. | li | fval0 fval | ; intialize variables address for &fvals[0] |
| 44. | Lw | fval0 fval0 | ; fval0 = &fvals[0] |
| 45. | li | A 0x3f | ; A = 0x3f |
| 46. | and | 1 work1 A | ; 1 = works[1] & 0x3fL |
| 47. | li | B SP7LL | ; B = SP7LL |
| 48. | Lw | B B | ; B = &SP7LL |
| 49. | add | B B 1 | ; B = &SP7LL[ works[1] & 0x3fL] |
| 50. | Lw | B B | ; B = SP7LL[ works[1] & 0x3fL]; |
| 51. | sw | fval0 B | ; fvals[0] = SP7LL[ works[1] & 0x3fL]; |
| 52. | li | B SP7RR | ; B = SP7RR |
| 53. | Lw | B B | ; B = &SP7RR |
| 54. | add | B B 1 | ; B = &SP7RR[ works[1] & 0x3fL] |
| 55. | Lw | B B | ; B = SP7RR[ works[1] & 0x3fL]; |
| 56. | add | 1 fval0 const1 | ; 1 = &fvals[1] |
| 57. | sw | 1 B | ; fvals[1] = SP7RR[ works[1] & 0x3fL]; |
| 58. | ; |     fvals[0] |= SP5LL[ (works[1] >> 8) & 0x3fL] ; | |
| 59. | ; |     fvals[1] |= SP5RR[ (works[1] >> 8) & 0x3fL] ; | |
| 60. | li | 1 0 | ; 1 = 0 |
| 61. | add | 1 work1 1 | ; 1 = works[1] |
| 62. | li | C 8 | ; 1 = (works[1] >> 8) |
| 63. | jal | lnk rshft | ; |
| 64. | and | 1 1 A | ; 1 = (works[1] >> 8) & 0x3fL |
| 65. | li | B SP5LL | ;     B = SP5LL |
| 66. | Lw | B B | ; B = &SP5LL |
| 67. | add | B B 1 | ; B = &SP5LL[(works[1] >> 8) & 0x3fL] |
| 68. | Lw | B B | ; B = SP5LL[(works[1] >> 8) & 0x3fL]; |
| 69. | Lw | C fval0 | ; C = fvals[0] |
| 70. | or | C C B | ; fvals[0] |= SP5LL[(works[1] >> 8) & 0x3fL]; |
| 71. | sw | fval0 C | ; fvals[0] = C |
| 72. | li | B SP5RR | ; B = SP5RR |
| 73. | Lw | B B | ; B = &SP5RR |
| 74. | add | B B 1 | ; B = &SP5RR[(works[1] >> 8) & 0x3fL] |
| 75. | Lw | B B | ; B = SP5RR[(works[1] >> 8) & 0x3fL]; |
| 76. | or | fval1 fval1 B | ; fvals[1] |= SP5RR[(works[1] >> 8) & 0x3fL]; |
| 77. | ; routine to left shift register 1 by C (reg.) places | | |
| 78. | rtls | sla | 1 1 | ; |
| 79. | sub | C C const1 | ; C-- |
| 80. | bnz | C rtls | ; (C > 0) loop |
| 81. | jr | lnk | ; return to caller |
| 82. | ; routine to right shift register 1 by C (reg.) places | | |
| 83. | ; warning : need to convert arithmetic shift to unsigned right shift | | |
| 84. | ; used reg k as temporary var | | |
| 85. | rshft | Lw | B const1 ; B = sign bit to extract | |
| 86. | and | B 1 B | ; B contains the sign bit of 1 |
| 87. | sra | 1 1 | ; |
| 88. | xor | 1 1 B | ; |
| 89. | sub | C C const1 | ; C-- |
| 90. | bnz | C rshft1 | ; (C > 0) loop |
| 91. | jr | lnk | ; return to caller |
| 92. | rshft1 | sra | 1 1 ; | |
| 93. | sub | C C const1 | ; C-- |
| 94. | bnz | C rshft1 | ; (C > 0) loop |
| 95. | jr | lnk | ; return to caller |

TABLE 5

The corresponding Assembly language program to implement the C program statement #5 of Table 2 for the embodiment of FIG. 7 - lines starting with a ";" are the comment lines.

; fval |= SP5[(work >> 8) & 0x3fL];

| 1. | li | A 0x3f | ; A = 0x3f |
| 2. | add | 1 work 0 | ; 1 = work |
| 3. | li | C 8 | ; C = 8 ; initialize shifting counter to 8 |
| 4. | sw | SCC C | ; I/O to set external Shift Counter Control (SCC) to 8, when zero, it enables RIM_shft |
| 5. | li | C 24 | ; C = 24 ; initialize internal shifting counter to 24 to provide extra pseudo instructions. |

TABLE 5-continued

The corresponding Assembly language program to implement the C program statement #5
of Table 2 for the embodiment of FIG. 7 - lines starting with a ";" are the comment lines.

| | | | |
|---|---|---|---|
| 6. | jal | link rshft | ; jump to Subroutine to right shift register 1 by C (reg.) places; 1 = (work >> 24) |
| 7. | and | 1 1A | ; 1 = (work >> 8) & 0x3fL |
| 8. | li | B SP5 | ; B = &SP5 |
| 9. | add | B B 1 | ; B = &SP5[(work >> 8) & 0x3fL] |
| 10. | Lw | B B | ; B = SP5[(work >> 8) & 0x3fL]; |
| 11. | Lw | C fval | ; C = fval |
| 12. | or | C C B | ; fval = C |= SP5[(work >> 8) & 0x3fL]; |
| 13. | sw | fval C | ; fval = C |
| 14. | ; "rshft" is the routine to right shift register 1 by C (reg.) places with Random Instruction Masking (RIM) enabled | | |
| 15. | rshft sw | RIM_start | ; I/O to start RIM by allowing insertion of random instructions with CPU |
| | | | ; registers update disabled. (i.e., begin of RIM statements block) |
| | | ... | ; random instruction from random number generator |
| | | ... | ; random instruction from random number generator |
| 16. | | sw RIM_stop | ; I/O to stop Random Instruction Masking by enabling update of registers; ; (i.e., end of RIM statements block) |
| 17. | sra | 1 1 | ; register 1 is shifted right by one place |
| 18. | sub | C C const1 | ; C--; decrement count register by one |
| 19. | bnz | C rshft | ; (C > 0) loop |
| 20. | jr | link | ; return to caller |

The invention claimed is:

1. A method of altering a power trace of a cryptographic architecture comprising:
running an encryption algorithm having a plurality of substitution-permutation sequences;
setting a control flag; and
inserting a number of pseudo instructions within one or more of said substitution-permutation sequences when said control flag is set, said pseudo instructions mimicking corresponding real instructions of said encryption algorithm energy consumption wise without affecting calculations performed according to said encryption algorithm,
wherein setting a control flag further comprises halting a state machine of a processor running said encryption algorithm,
wherein the halting of the state machine further comprises disabling a destination register in said state machine, and
wherein the number of pseudo instructions inserted within one or more of said substitution-permutation sequences is such that the number of pseudo instructions inserted within one or more of said substitution-permutation sequences is the same or such that the number of pseudo instructions randomly varies between two or more of said substitution-permutation sequences.

2. The method of claim 1 further comprising modifying said encryption algorithm to shuffle an access order of a plurality of lookup tables corresponding to said plurality of substitution-permutation sequences.

3. The method of claim 1 wherein said encryption algorithm is a Date Encryption Standard (DES) algorithm.

4. The method of claim 1 further comprising resetting said control flag, wherein said step of resetting further comprises sending a signal from a random number generator to a control flag register.

5. The method of claim 1 wherein the number of pseudo instructions inserted within one or more of said substitution-permutation sequences is a random number.

6. The method of claim 1 wherein the number of pseudo instructions inserted within one or more of said substitution-permutation sequences is such that a number of shifting instructions inserted within one or more of said substitution-permutation sequences is the same or such that the number of shifting instructions randomly varies between two or more of said substitution-permutation sequences.

7. A method of altering a power trace of a cryptographic architecture comprising:
running an encryption algorithm having a plurality of substitution-permutation sequences;
setting a control flag; and
inserting a number of pseudo instructions within one or more of said substitution-permutation sequences when said control flag is set said pseudo instructions mimicking corresponding real instructions of said encryption algorithm energy consumption wise without affecting calculations performed according to said encryption algorithm,
wherein setting a control flag further comprises halting a state machine of a processor running said encryption algorithm,
wherein the halting of the state machine further comprises disabling a destination register in said state machine, and
wherein the number of pseudo instructions inserted within one or more of said substitution-permutation sequences is such that a number of shifting instructions within each substitution-permutation sequence is the same.

8. The method of claim 6 further comprising modifying said encryption algorithm to shuffle an access order of a plurality of lookup tables corresponding to said plurality of substitution-permutation sequences.

9. The method of claim 6 wherein said encryption algorithm is a Date Encryption Standard (DES) algorithm.

10. The method of claim 6 further comprising resetting said control flag, wherein said step of resetting further comprises sending a signal from a random number generator to a control flag register.

* * * * *